US012167801B2

(12) United States Patent
Berglund et al.

(10) Patent No.: US 12,167,801 B2
(45) Date of Patent: *Dec. 17, 2024

(54) MERCHANDISE DISPLAY HOOK INCLUDING ANTI-SWEEP MECHANISM

(71) Applicant: InVue Security Products Inc., Charlotte, NC (US)

(72) Inventors: David N. Berglund, Indian Trail, NC (US); Erik L van Bergen, Waxhaw, NC (US); Christopher J. Fawcett, Charlotte, NC (US); Jeffrey A. Hendren, Matthews, NC (US); A. Reneau Van Landingham, Jr., Gastonia, NC (US); Matthew Thomas Kerley, Fort Mill, SC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/105,558

(22) Filed: Feb. 3, 2023

(65) Prior Publication Data
US 2023/0180947 A1    Jun. 15, 2023

Related U.S. Application Data

(63) Continuation of application No. 17/233,860, filed on Apr. 19, 2021, now Pat. No. 11,571,076, which is a (Continued)

(51) Int. Cl.
*A47F 1/12* (2006.01)
*A47F 5/00* (2006.01)
(Continued)

(52) U.S. Cl.
CPC ............ *A47F 1/128* (2013.01); *A47F 5/0006* (2013.01); *A47F 5/0823* (2013.01); (Continued)

(58) Field of Classification Search
CPC ........ A47F 1/125; A47F 1/128; A47F 5/0006; A47F 5/0823; A47F 5/0838;
(Continued)

(56) References Cited

U.S. PATENT DOCUMENTS 2,954,128 A    9/1960  Gordon
4,600,119 A    7/1986  Olson
(Continued)

FOREIGN PATENT DOCUMENTS

WO    2005070263 A2    8/2005
WO    2016015507 A1    2/2016

OTHER PUBLICATIONS

Extended European Search Report from corresponding European Application No. 17757031.4, dated Dec. 19, 2017 (7 pages).
International Search Report and Written Opinion from corresponding International Application No. PCT/US2017/0183256, dated May 5, 2017 (12 pages).

*Primary Examiner* — Patrick D Hawn
(74) *Attorney, Agent, or Firm* — InVue Security Products Inc.

(57) ABSTRACT

A merchandise display hook and method for dispensing one or more items of merchandise from a merchandise display hook and/or for loading one or more items of merchandise onto the display hook are provided. The display hook may include at least one rod configured to be mounted to a display fixture and to receive one or more items of merchandise thereon. The display hook may also include a helix disposed about the rod and extending at least partially along a length of the rod. The helix is configured to rotate in a dispensing direction for dispensing the one or more items of merchandise from the rod and/or an opposite loading direction for loading the one or more items of merchandise onto the rod.

19 Claims, 20 Drawing Sheets

Related U.S. Application Data continuation of application No. 16/776,875, filed on Jan. 30, 2020, now Pat. No. 11,006,768, which is a continuation of application No. 16/008,791, filed on Jun. 14, 2018, now abandoned, which is a continuation-in-part of application No. 15/435,794, filed on Feb. 17, 2017, now Pat. No. 10,219,636.

(60) Provisional application No. 62/351,619, filed on Jun. 17, 2016, provisional application No. 62/335,267, filed on May 12, 2016, provisional application No. 62/298,745, filed on Feb. 23, 2016.

(51) Int. Cl.
*A47F 5/08* (2006.01)
*F16H 19/04* (2006.01)
*F16H 37/02* (2006.01)

(52) U.S. Cl.
CPC .......... *A47F 5/0838* (2013.01); *A47F 5/0869* (2013.01); *F16H 19/04* (2013.01); *F16H 37/02* (2013.01)

(58) Field of Classification Search
CPC ...... A47F 5/0861; A47F 5/0869; G06F 11/40; G06F 11/42; F16H 19/04; F16H 37/02
See application file for complete search history.

(56) References Cited

U.S. PATENT DOCUMENTS

| | | |
|---|---|---|
| 4,638,922 A | 1/1987 | Stoltz |
| 6,659,291 B2 | 12/2003 | Huchner et al. |
| 7,392,673 B2 | 7/2008 | Fawcett et al. |
| 7,533,784 B2 | 5/2009 | Vlastakis et al. |
| 7,559,437 B2 | 7/2009 | Colelli et al. |
| 8,523,012 B2 | 9/2013 | Richardson et al. |
| 8,684,227 B2 | 4/2014 | Richardson et al. |
| 8,842,011 B2 | 9/2014 | Casey |
| 9,675,184 B2 | 6/2017 | Xin |
| 10,111,540 B2 | 10/2018 | Brej |
| 10,219,636 B2 | 3/2019 | Berglund et al. |
| 2007/0283615 A1 | 12/2007 | Vlastakis et al. |
| 2009/0095695 A1 | 4/2009 | Moock et al. |
| 2009/0145918 A1 | 6/2009 | Colelli et al. |
| 2009/0184129 A1 | 7/2009 | Vlastakis et al. |
| 2010/0280655 A1 | 11/2010 | Wilson et al. |
| 2011/0036789 A1 | 2/2011 | Richardson et al. |
| 2011/0127225 A1 | 6/2011 | Hooks, Jr. et al. |
| 2012/0253508 A1 | 10/2012 | Holmes |
| 2014/0048756 A1 | 2/2014 | Chen et al. |
| 2015/0096998 A1 | 4/2015 | Bird et al. |
| 2016/0227942 A1 | 8/2016 | Xin |
| 2017/0238724 A1 | 8/2017 | Berglund et al. |
| 2017/0265653 A1 | 9/2017 | Brej |
| 2018/0242758 A1 | 8/2018 | Bird et al. |
| 2018/0296007 A1 | 10/2018 | Berglund et al. |
| 2020/0163469 A1 | 5/2020 | Berglund et al. |

MERCHANDISE DISPLAY HOOK INCLUDING ANTI-SWEEP MECHANISM

CROSS REFERENCE TO RELATED APPLICATIONS

This application is a continuation of U.S. application Ser. No. 17/233,860, filed on Apr. 19, 2021, which is a continuation of U.S. application Ser. No. 16/776,875, filed on Jan. 30, 2020, and now U.S. Pat. No. 11,006,768, which is a continuation of U.S. application Ser. No. 16/008,791, filed on Jun. 14, 2018, which is a continuation-in-part of U.S. application Ser. No. 15/435,794, filed on Feb. 12, 2017, and now U.S. Pat. No. 10,219,636, claims the benefit to priority of U.S. Provisional Patent Application No. 62/298,745 filed on Feb. 23, 2016, U.S. Provisional Patent Application No. 62/335,267 filed on May 12, 2016, and U.S. Provisional Patent Application No. 62/351,619 filed on Jun. 17, 2016, the entire disclosures of which are incorporated herein by reference.

FIELD OF THE INVENTION

The invention relates generally to a merchandise display hook for displaying items of merchandise on a display fixture.

BACKGROUND AND RELATED ART

Merchandise display hooks are utilized extensively to display items of merchandise, for example, in a retail store. Typically, a plurality of display hooks are each individually mounted on a generally vertical display fixture, such as a conventional slat wall or slot wall, wire grid, bar rack or pegboard. The use of multiple display hooks on the display fixture provides an aesthetic and organized display area that allows potential purchasers to view the items of merchandise without assistance from sales personnel.

BRIEF SUMMARY

Embodiments of the present invention are directed towards merchandise display hooks and methods for dispensing one or more items of merchandise from a merchandise display hook and/or for loading one or more items of merchandise onto the display hook. In one embodiment, a merchandise display hook includes at least one rod configured to be mounted to a display fixture and to receive one or more items of merchandise thereon and a helix disposed about the rod and extending at least partially along a length of the rod. The helix is configured to rotate in a dispensing direction for dispensing the one or more items of merchandise from the rod. The merchandise display hook further includes an anti-sweep mechanism operably engaged with the helix and configured to rotate the helix in the dispensing direction in a first mode, wherein the anti-sweep mechanism is prevented from rotating the helix in the dispensing direction in a second mode.

In another embodiment, a method includes securing a merchandise display hook to a display fixture. The merchandise display hook includes at least one rod and a helix disposed about at least a lengthwise portion of the rod, as well as an anti-sweep mechanism operably engaged with the helix. The method also includes actuating the anti-sweep mechanism such that the anti-sweep mechanism rotates the helix in a dispensing direction to dispense at least one item of merchandise from the rod in a first mode, wherein the anti-sweep mechanism is prevented from rotating the helix in the dispensing direction in a second mode.

In one embodiment, a merchandise display hook includes at least one rod having a first end configured to be mounted to a display fixture and a second end opposite the first end and a helix disposed about the rod and extending at least partially along a length of the rod. The helix is configured to rotate in a dispensing direction for dispensing the one or more items of merchandise from the second end of the rod and/or an opposite loading direction for loading the one or more items of merchandise onto the second end of the rod. The merchandise display hook also includes an anti-sweep mechanism configured to be linearly actuated for loading one or more items of merchandise onto the rod and/or for dispensing the one or more items of merchandise from the rod.

In another embodiment, a merchandise display hook includes at least one rod configured to be mounted to a display fixture and to receive one or more items of merchandise thereon and a helix disposed about the rod and extending at least partially along a length of the rod. In addition, the merchandise display hook includes an anti-sweep mechanism comprising an actuator operably engaged with the helix, wherein the anti-sweep mechanism is configured to rotate the helix for dispensing the one or more items of merchandise from the rod in response to linear actuation of the actuator.

In one embodiment, a merchandise display hook includes at least one rod configured to be mounted to a display fixture and to receive one or more items of merchandise thereon and a helix disposed about the rod and extending at least partially along a length of the rod. The merchandise display hook also includes an anti-sweep mechanism comprising an actuator operably engaged with the helix and a time delay mechanism operably engaged with the actuator. The anti-sweep mechanism is configured to rotate the helix for dispensing the one or more items of merchandise from the rod in response to actuation of the actuator, and the time delay mechanism is configured to disable the actuator for a predetermined period time following actuation of the actuator.

In another embodiment, a merchandise display hook includes at least one rod configured to receive one or more items of merchandise thereon and a base coupled to the rod and configured to be mounted to a display fixture. The merchandise display hook includes a helix disposed about the rod and extending at least partially along a length of the rod, wherein the helix is configured to rotate in a dispensing direction for dispensing the one or more items of merchandise from the rod and/or an opposite loading direction for loading the one or more items of merchandise onto the rod. Moreover, the merchandise display hook includes an anti-sweep mechanism at least partially housed within the base and operably engaged with the helix, wherein the anti-sweep mechanism is configured to dispense the one or more items of merchandise from the rod.

In one embodiment, a merchandise display hook includes at least one rod configured to be mounted to a display fixture and to receive one or more items of merchandise thereon and a helix disposed about the rod and extending at least partially along a length of the rod. The merchandise display hook also includes an anti-sweep mechanism comprising an actuator and a loading mechanism each operably engaged with the helix, wherein the anti-sweep mechanism is configured to dispense the one or more items of merchandise from the rod in response to actuation of the actuator and to load the one or more items of merchandise onto the rod in response to actuation of the loading mechanism.

In another embodiment, a merchandise display hook includes at least one rod configured to be mounted to a display fixture and to receive one or more items of merchandise thereon, the rod having an upturn at its free end. The merchandise display hook includes a helix disposed about the rod and extending at least partially along a length of the rod, wherein the helix is configured to rotate in a dispensing direction for dispensing the one or more items of merchandise from the rod. The merchandise display hook also includes an anti-sweep mechanism operably engaged with the helix and configured to dispense the one or more items of merchandise onto the free end whereby the one or more items of merchandise is configured to be supported on the free end.

In one embodiment, a merchandise display hook includes at least one rod configured to be mounted to a display fixture and to receive one or more items of merchandise thereon and a helix disposed about the rod and extending at least partially along a length of the rod. The helix is configured to rotate in a dispensing direction for dispensing the one or more items of merchandise from the rod. The merchandise display hook also includes an anti-sweep mechanism operably engaged with the helix and configured to bias the helix for rotation in the dispensing direction.

In one embodiment, a merchandise display hook includes a helix configured to be mounted to a display fixture and to rotate in a dispensing direction for dispensing one or more items of merchandise from the helix and an anti-sweep mechanism operably engaged with the helix and configured to rotate the helix in the dispensing direction in a first mode. The anti-sweep mechanism is prevented from rotating the helix in the dispensing direction in a second mode.

DETAILED DESCRIPTION OF EMBODIMENTS OF THE INVENTION

Figure 2:
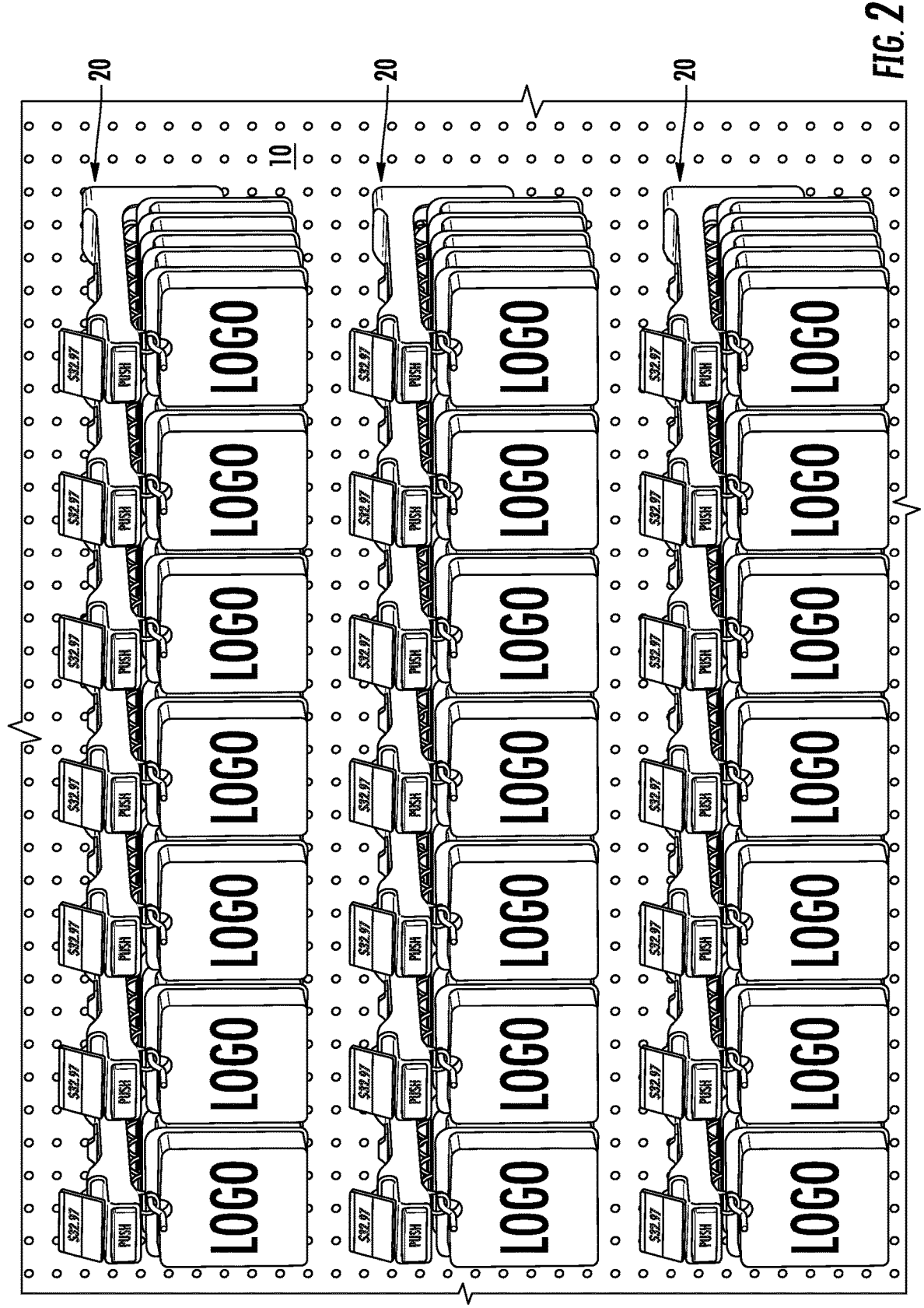
FIG. 2 is a perspective view of a plurality of the display hooks shown in FIG. 1 mounted to a display fixture according to one embodiment of the present invention.

The accompany drawing figures illustrate one or more embodiments of a merchandise display hook 20 for mounting on a display fixture 10, such as a pegboard, slat wall or slot wall, wire grid or bar rack. For convenience, the display fixture 10 shown herein is a conventional pegboard type display fixture commonly referred to as "pegboard." The display hook 20 comprises an anti-sweep mechanism 40 constructed in accordance with embodiments of the invention. The anti-sweep mechanism 40 is operable for increasing the amount of time required to remove an item of merchandise 12 from the display hook 20, while still permitting loading (commonly referred to as "stocking") of the items of merchandise onto the display hook for being displayed within a display area of a retail store. Each item of merchandise 12 is suspended from the display hook 20, or alternatively, is secured within a safer or box that is suspended from the display hook. As shown and described herein, the merchandise display hook 20 may be a peg style display hook, also referred to as a "peg hook," suitable for mounting on the pegboard. Pegboard is typically made of metal, plastic, cardboard or pressed board and has a plurality of regularly spaced apertures 11 formed therethrough for receiving mounting structure of the display hook 20, as will be described. In some embodiments, a plurality of merchandise display hooks 20 may be configured to be secured to the display fixture 10 (see, e.g., FIG. 2). Although a display hook 20 is shown and described herein for purposes of illustration and explanation, it will be readily apparent to those skilled in the art that the broad concept of the invention is applicable to other types of merchandise display hooks configured with suitable mounting structure for mounting on a different type of display fixture, such as, for example, slat wall or slot wall, wire grid, or bar rack.

Figure 1:
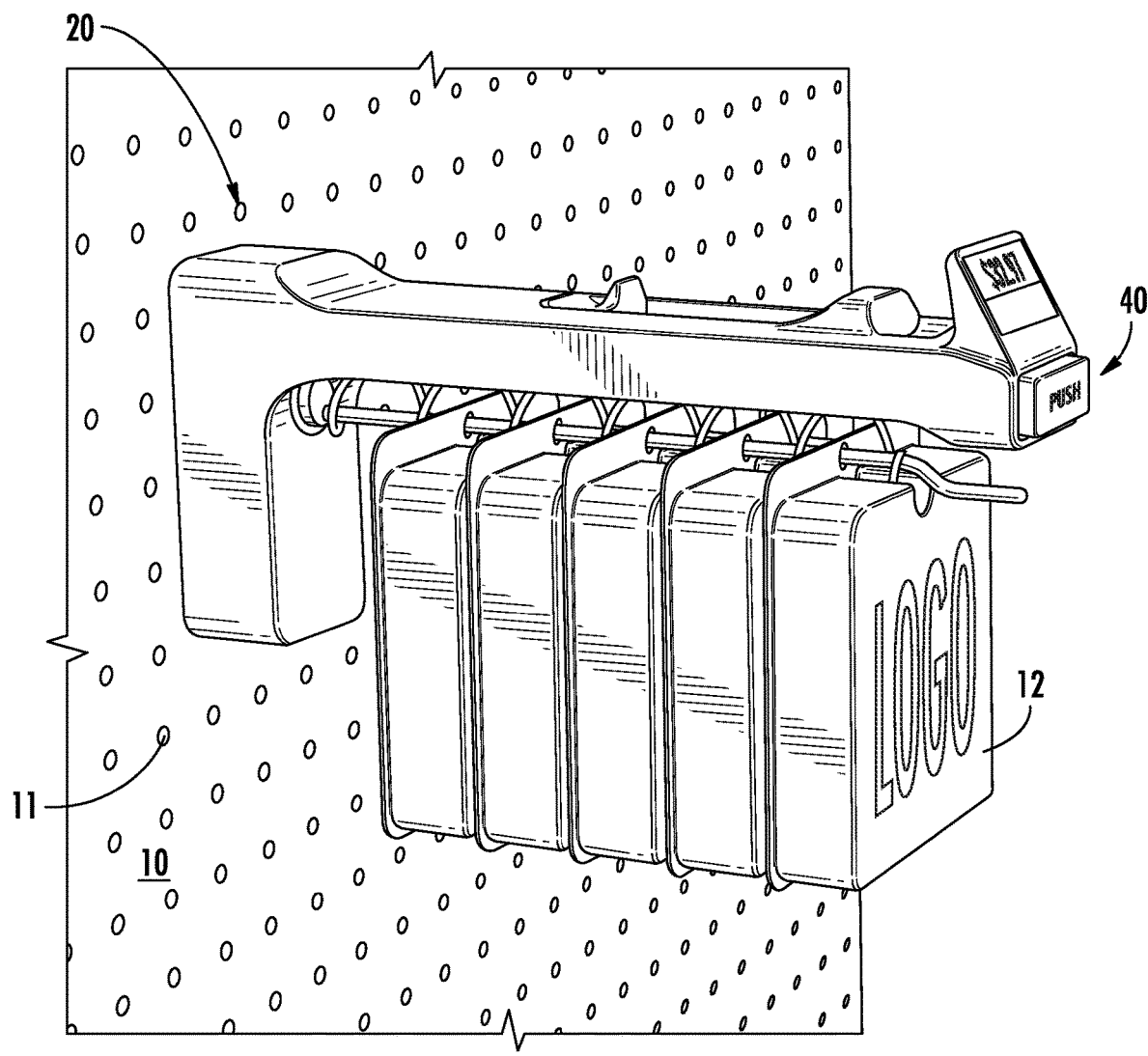
FIG. 1 is a perspective view of a display hook mounted to a display fixture according to one embodiment of the present invention.

FIG. 1 shows a display hook 20 comprising an anti-sweep mechanism 40 according to an embodiment of the invention with the display hook configured to be mounted onto a display fixture 10, such as pegboard. In one embodiment, display hook 20 comprises a lower rod 24 and an upper rod 26 and a helix 42. It is understood that the use of the term "rod" is not intended to be limiting, as the lower 24 and upper 26 rods may be any desired structure configured to receive, support, and/or dispense items of merchandise 12 and/or cooperate with the anti-sweep mechanism 40. For example, the upper rod 26 may be a structure or housing configured to house portions of the anti-sweep mechanism 40. In some cases, the upper rod 26 may be a structure or housing that comprises one or more components of the anti-sweep mechanism 40, such as an actuator 50 and/or a loading mechanism 60.

Moreover, in some embodiments, the lower rod 24 may be omitted, as the items of merchandise may be supported directly on the helix 42. In other embodiments, the helix 42 may be positioned above the lower rod 24. Or, the helix 42 may be omitted completely, and items of merchandise 12 may be dispensed directly off of the lower 24 or upper 26 rods. For example, a gate may be positioned at the end of the lower rod 24 or the upper rod 26 that allows one item of merchandise 12 to be removed at a time. In other cases, a cable, belt, or the like may be employed to move each item of merchandise 12 in a dispensing or loading direction. For instance, the cable, belt, or the like may include hooks for holding each item of merchandise 12, "teeth" for separating the items of merchandise from one another, or a high friction surface. In yet another embodiment, at least the helix 42 may be enclosed, such as in a box-like structure.

Figure 34:
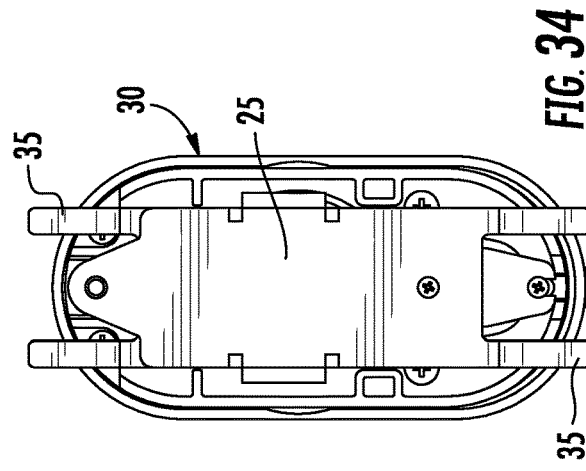
FIG. 34 is a rear view of a merchandise display hook according to another embodiment of the present invention.

The end of the lower rod 24 may have a free end 23 that is upturned slightly for retaining an item of merchandise on the lower rod against the influence of gravity. However, it is not essential that the free end 23 of the lower rod 24 be upturned since the anti-sweep mechanism 40 serves to retain the items of merchandise on the lower rod 24, as will be described. In some embodiments shown in FIGS. 3-5, the free end 23 extends at an oblique angle from the lower rod 24 such that items of merchandise may fall under the influence of gravity onto the free end as will be explained in further detail below. Display hook 20 may further comprise mounting structure 25 including at least one, and preferably more than one, mounting peg 35 for engaging a corresponding aperture 11 formed through the display fixture 10 to mount the display hook 20 to the pegboard that extends outwardly from and is generally perpendicular to the plane of the pegboard. For example, FIG. 34 shows an embodiment, wherein the mounting structure 25 includes a plurality of mounting pegs 35 each configured to engage the display fixture 10. In this embodiment, a pair of mounting structures 25 may be used such that a first mounting structure is configured to be attached to the display fixture 10 and then subsequently the second mounting structure is attached to the display fixture and fixedly attached to the first mounting structure, e.g., with a fastener or locking mechanism, such that the merchandise display hook cannot be removed from the display fixture without first removing one of the mounting structures. An optional label holder 46 may also be provided adjacent a front portion of the upper rod 26 for displaying information, such as price, related to the items of merchandise 12 supported on the display hook 20.

The merchandise display hook 20 may further comprise a base 30 for locking or otherwise securing the display hook to the display fixture 10. In some cases, the base 30 is fixed in position relative to the lower 24 and upper 26 rods. In one embodiment, the base 30 (or a portion thereof) may be configured to slide in a lengthwise direction along upper rod 26 above lower rod 24 between an unlocked position distant from mounting peg(s) of the mounting structure 28 and a locked position proximate the mounting peg(s) in which the display fixture 10 is firmly sandwiched between the base and the mounting peg(s). In other embodiments, the base 30 may lock to an adapter secured to the pegboard. Thus, the base 30 may be configured to be locked to and unlocked from the adapter. In this position, the display hook 20 cannot be angled upwardly and the mounting peg(s) retracted through the aperture(s) 11 in the display fixture 10 to thereby remove the display hook 20 from the pegboard. The base 30 may be configured to cooperate with a key (e.g., a magnetic key) to unlock the base and thereby permit the display hook 20 to be removed from the display fixture in the manner previously described. A base and key suitable for use with the invention is described in greater detail in U.S. Pat. No. 8,341,987, issued on Jan. 1, 2013, the disclosure of which is incorporated herein in its entirety.

Figure 3:
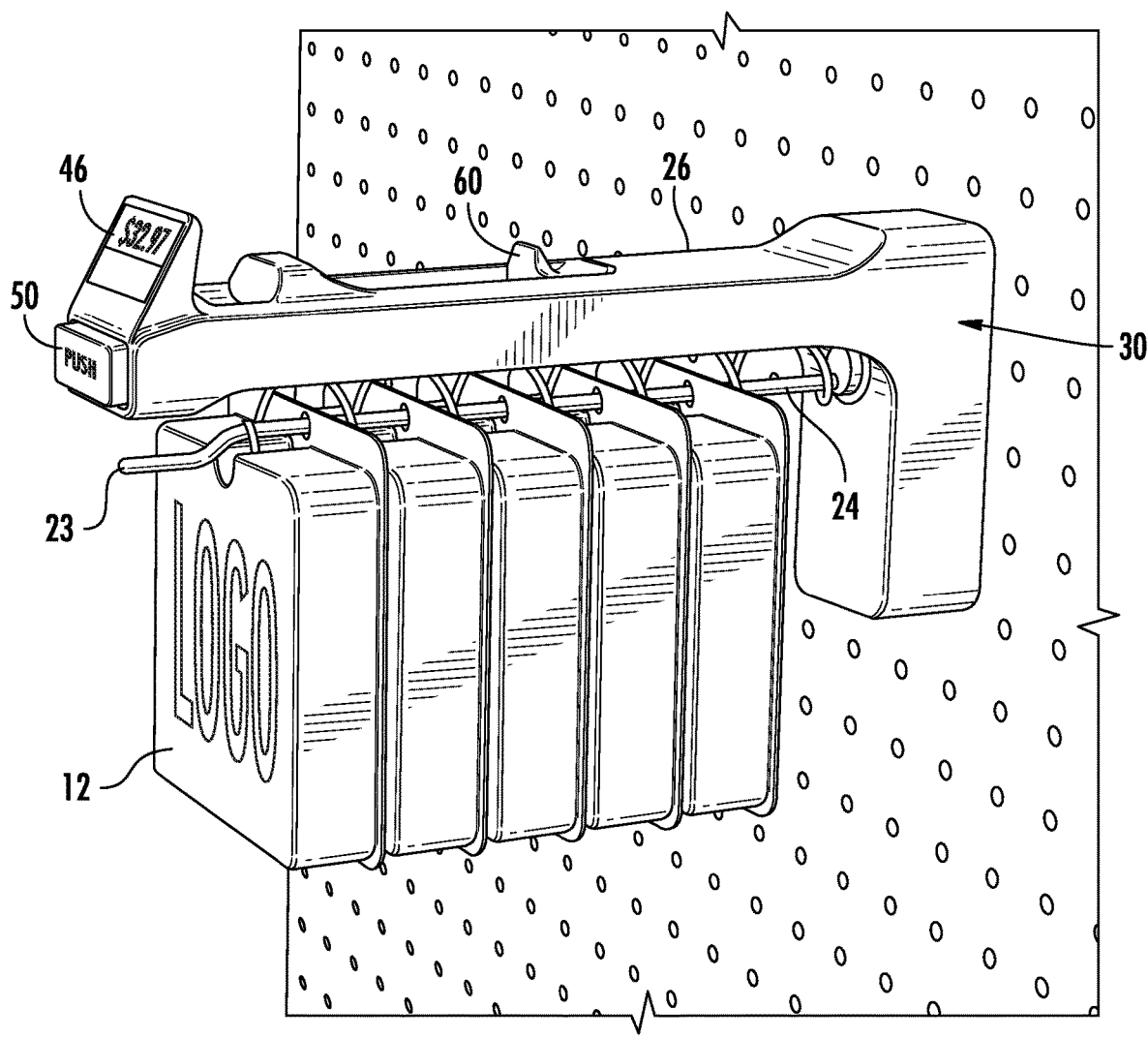
FIG. 3 is another perspective view of the display hook shown in FIG. 1.
Figure 4:
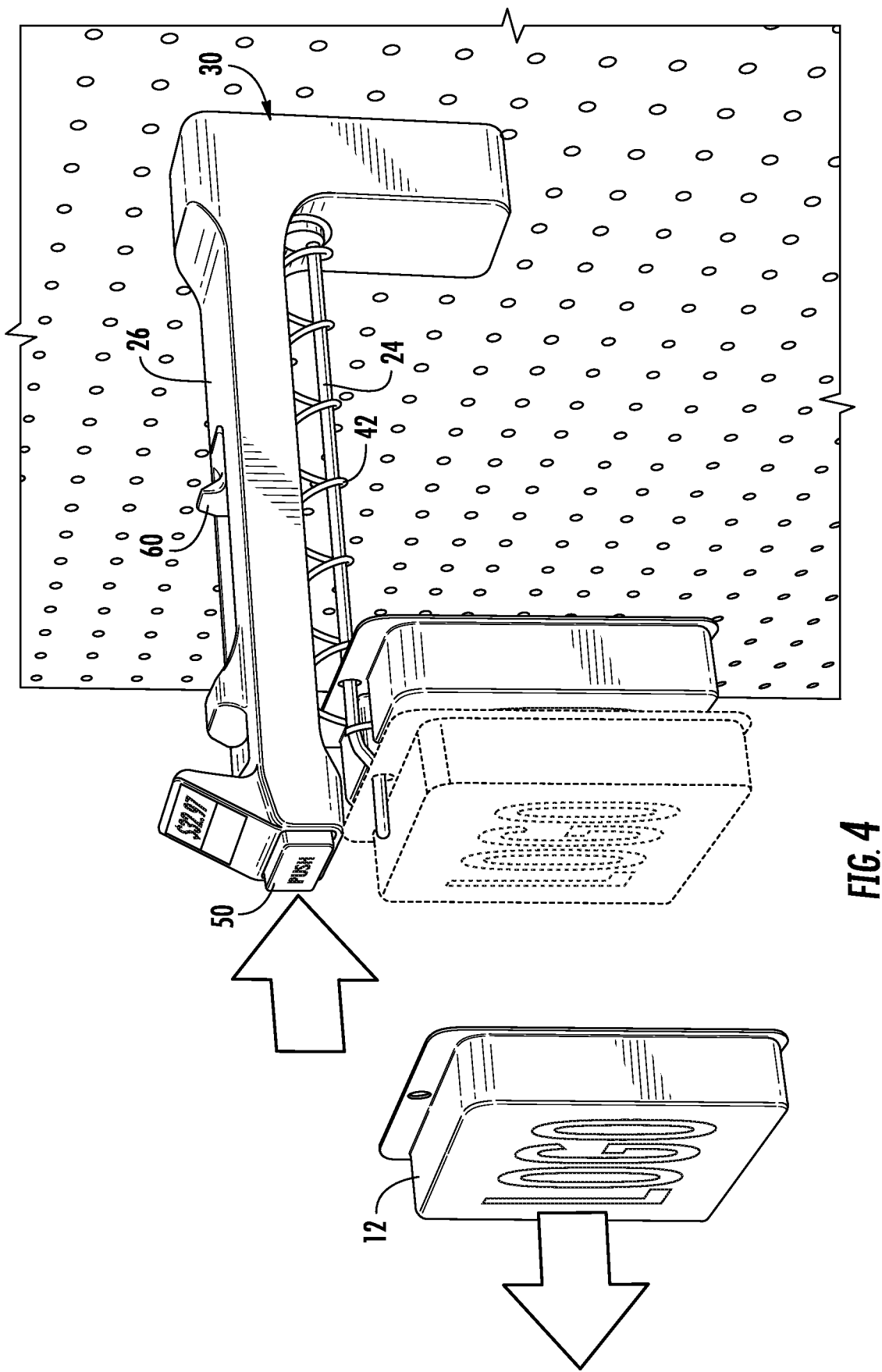
FIG. 4 is a side perspective view of the display hook shown in FIG. 1 dispensing an item of merchandise according to one embodiment of the present invention.

As shown in FIGS. 3-4, anti-sweep mechanism 40 comprises a length of a helix 42 or coil extending outward from the base 30 and extending lengthwise along at least a portion of the lower rod 24. In some cases, the end of the helix 42 may be positioned adjacent to the free end 23 of the lower rod 24. Rotation of the helix 42 in a first direction is configured to dispense items of merchandise from the lower rod 24, while rotation of the helix in an opposite direction is configured to load items of merchandise onto the lower rod. It is understood that the pitch of the helix 42 may be modified depending on the number and size of items of merchandise desired to be supported on the lower rod 24. The helix 42 may be a conventional "coil spring" type helix having a substantially constant pitch. As used herein, the term "pitch" is intended to mean the axial distance between corresponding points on adjacent coils of the helix 42. However, a helix having a variable pitch may be used as desired to vary the distance an item of merchandise 12 is moved along the lower rod 24 in response to one full (i.e., about 360 degrees) rotation of the helix. In the embodiment shown and described herein, the pitch of the helix 42 is sufficient to accommodate the thickness of the packaging for the item of merchandise 12, or a safer containing the item of merchandise, which may limit a shoplifter's access to the opening of the packaging or safer that receives the lower rod 24 of the display hook 20. In this manner, a shoplifter may have more limited access for cutting the packaging or keeper on either side of the opening and forcibly removing the item of merchandise 12 from the lower rod 24 between adjacent coils of the helix 42.

Figure 5:
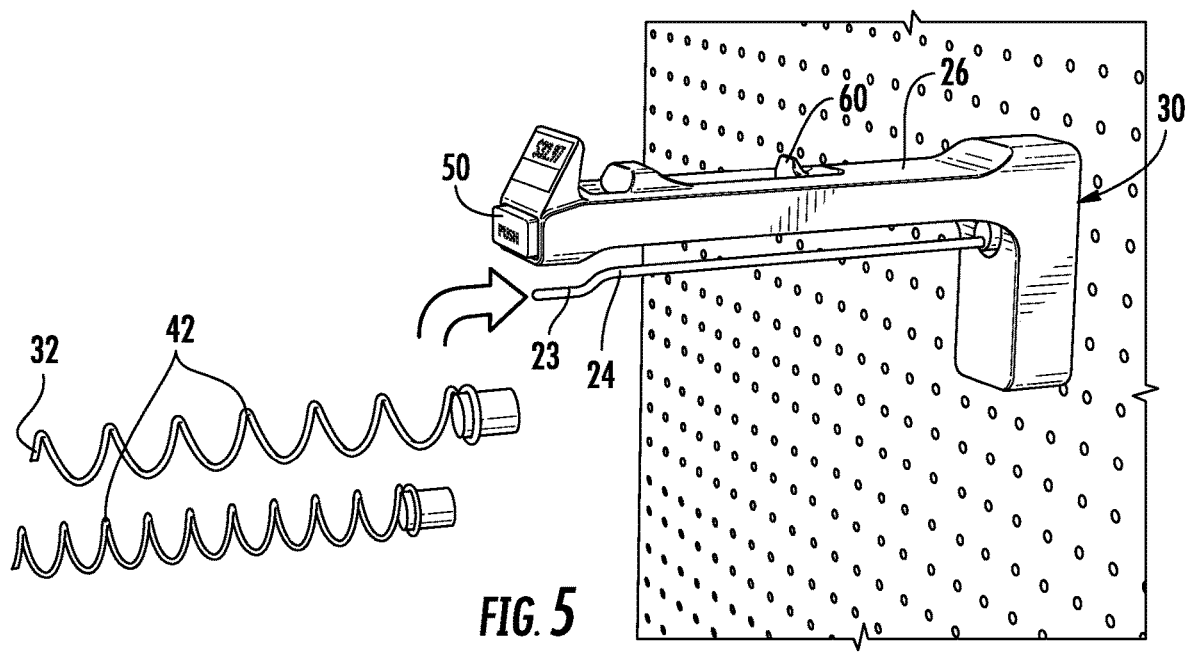
FIG. 5 is a perspective view of a display hook having a plurality of removable helixes according to one embodiment of the present invention.

In some embodiments, the helix 42 may be removably attached to the rod 24 and/or base 30. That is, the helix 42 may be removable from the base 30 without damaging the merchandise display hook 20. For example, FIG. 5 shows that the helix 42 may be removably attached to the base 30.

Figure 16:
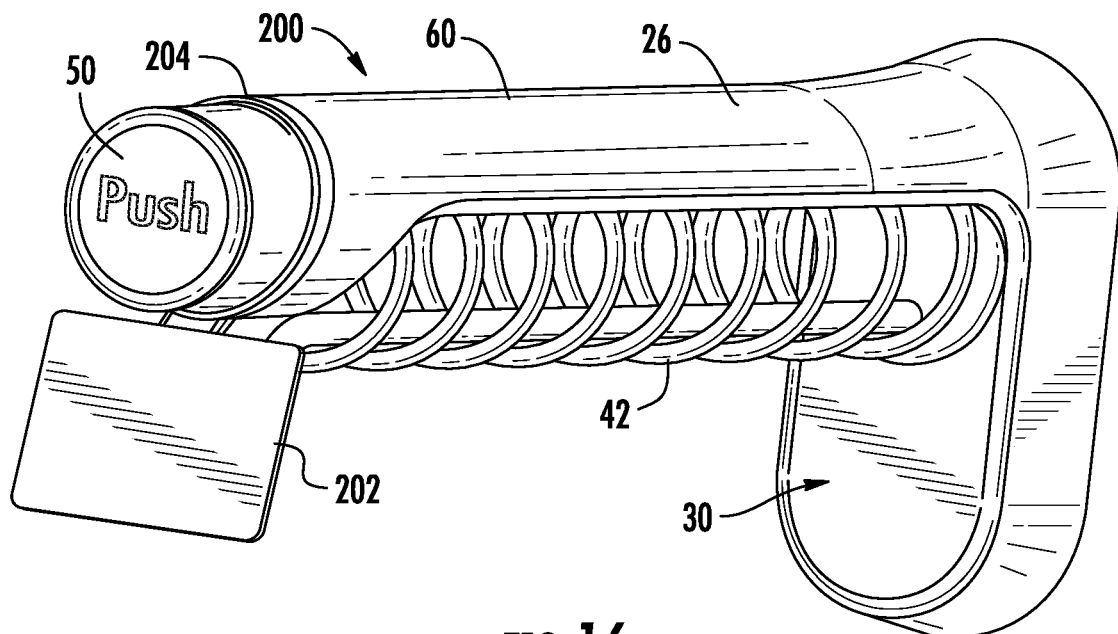
FIG. 16 is a perspective view of a display hook according to one embodiment of the present invention.

Thus, different sizes and configurations of helixes 42 may be employed, such as for accommodating different sizes and configurations of items of merchandise 12 or the packaging of the item of merchandise. Advantageously, each helix 42 may be configured to be removed from and attached to the base 30 while the base is attached to the display fixture 10. Each helix 42 may be attached to the base 30 using any desired technique such as via one or more fasteners and/or engagement features and/or may be locked to the base in some cases. For example, FIG. 16 shows that the helix 42 may be configured to inserted through the base 30. In this embodiment, a free end of the helix 42 may be configured to first be inserted through a rear surface of the base 30 and then through a front surface of the base until the opposite end of the helix is seated within the base. In this example, the end of the base 30 may be keyed to receive a correspondingly shaped free end of the helix 42. When seated within the base 30, the helix 42 cannot be rotated relative to the base or removed without first removing the base from the display fixture 10.

Figure 7:
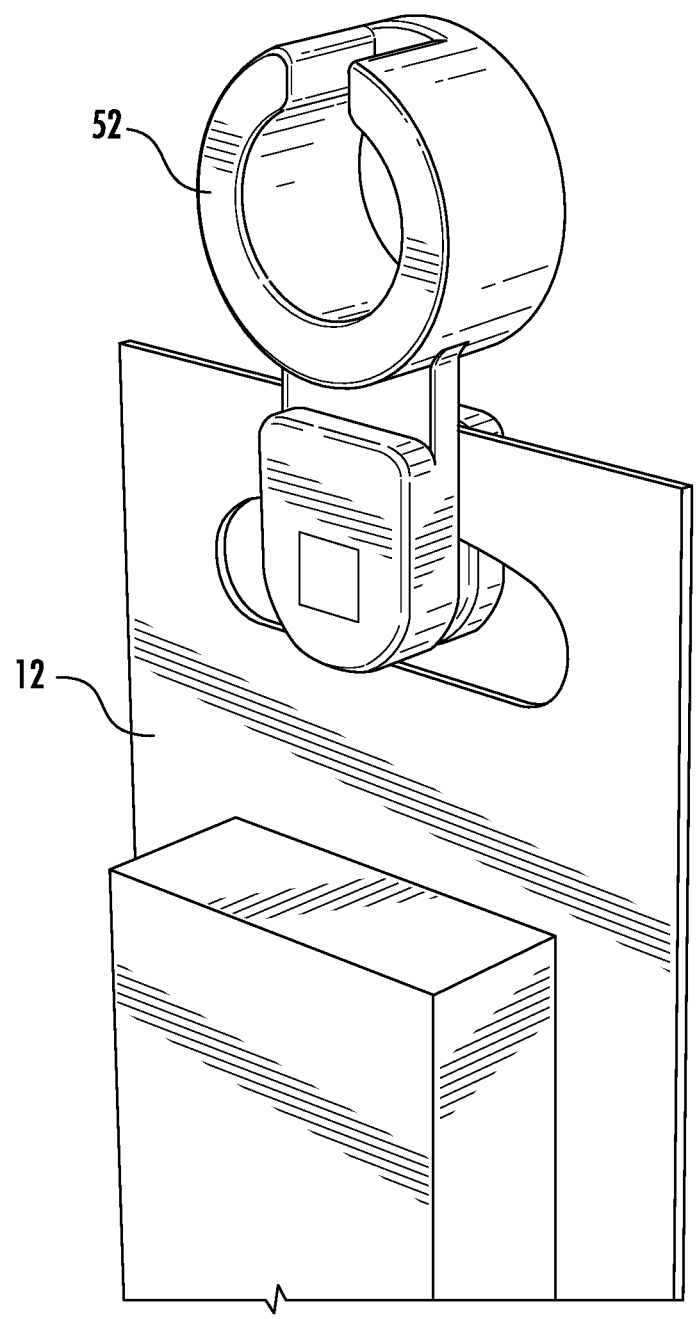
FIG. 7 is a perspective view of a package insert according to one embodiment of the present invention.

In one embodiment shown in FIG. 7, a package insert 52 may be configured to be secured to an item of merchandise 12 or its packaging. In this way, the package insert 52 is configured to be received onto the lower rod 24 and to maintain a desired spacing between items of merchandise 12. Thus, the package insert 52 may allow for increase spacing between items of merchandise that may have thin packaging or a lower profile.

In one embodiment, the anti-sweep mechanism 40 further comprises an actuator 50 mounted on the upper rod 26. The actuator 50 is operable for actuating the helix 42 for rotation relative to the lower rod 24 of the display hook 20 for dispensing items of merchandise. In the illustrated embodiment, the actuator 50 is a push button, although other mechanisms may be employed such as a rotatable handle, a lever, or a pull knob or like mechanism. However, manual rotation of the helix 42 may not be required. In some cases, actuation of the actuator 50 results in one full rotation of the helix 42 for dispensing a single item of merchandise on the lower rod 24.

The anti-sweep mechanism 40 may further include a loading mechanism 60 for loading items of merchandise onto the lower rod 24. The loading mechanism 60 may be operable for actuating the helix 42 for rotation relative to the lower rod 24 of the display hook 20 for loading items of merchandise. Thus, the loading mechanism 60 may be configured to actuate the helix 42 for rotation in an direction that is opposite to a direction for dispensing items of merchandise. In the illustrated embodiment, the loading mechanism 60 is a push button, although other mechanisms may be employed such as a rotatable handle. However, manual rotation of the helix 42 may not be required. In some cases, actuation of the loading mechanism 60 results in one full rotation of the helix 42 for loading a single item of merchandise on the lower rod 24.

In one embodiment shown in FIGS. 8-11, the anti-sweep mechanism 40 includes an anchor escapement 70 that is operably engaged with the actuator 50 and the loading mechanism 60. In some cases, the anchor escapement 70 is at least partially housed within the base 30. Thus, the drive mechanism for the helix 42 may be located in the base 30 rather than at a free end 32 of the helix 42. The anchor escapement 70 may include a gear mechanism 72 and a biasing element 74 (e.g., a coiled power spring) that are operably coupled to the helix 42. The gear mechanism 72 may include a plurality of gears 75, with at least one gear coupled to the loading mechanism 60, and at least one gear coupled to the actuator 50. In the illustrated example, four gears 75 are used, although any number may be used if desired. For example, one of the gears 80 may be used for dampening the helix 42 when dispensing items of merchandise 12 so that the helix does not rotate in a rapid manner. The loading mechanism 60 may be coupled to one or more gear(s) 75 such that movement of the loading mechanism rotates the gear(s) and loads the biasing element 74. The anchor escapement 70 may be configured to cooperate with the loading mechanism 60 for rotating the helix 42 in a loading direction. In this regard, actuating the loading mechanism 60 may result in loading the biasing element 74 which may be subsequently used for dispensing an item of merchandise when the actuator 50 is actuated. Each actuation of the loading mechanism 60 may result in one full rotation of the helix 42. Thus, for each actuation of the loading mechanism 60, the biasing element 74 may be loaded for subsequent dispensing. In some cases, the loading mechanism 60 may be configured to be pulled forward (away from the display fixture 10) for loading the biasing element 74, and the stored spring force may be subsequently used to rotate the helix 42 for dispensing an item of merchandise when the actuator 50 is actuated. The loading mechanism 60 may be coupled to one of the gears 82 via a linear drive mechanism 78 such that linear movement of the linear drive mechanism rotates the gear 82. In order to prevent the gear(s) 75 from rotating in a dispensing direction and unwinding the biasing element 74, a clutch 76 may be employed. Thus, once the biasing element 74 is loaded via actuating the loading mechanism 60 one or more times, the biasing element remains loaded until the actuator 50 is actuated. The biasing element 74 may be configured to store enough energy for each item of merchandise 12 loaded onto the lower rod 24. Thus, the spring energy may be sufficient to rotate the helix 42 for each item of merchandise 12 loaded onto the lower rod 24. Alternatively, the spring energy may be sufficient to dispense one item of merchandise. For instance, each actuation of the actuator 50 or loading mechanism 60 may load the spring and then rotate the helix 42 for dispensing the item of merchandise 12.

Thus, in some embodiments, loading a biasing element 74 may be used to store energy for rotating the helix 42. In other embodiments, actuation of the actuator 50 may directly drive the helix 42 to dispense an item of merchandise 12 such that the biasing element 74 may be omitted. In some embodiments, the power may be provided electronically, such as via a battery or a power wall outlet. In some cases, the power may be entirely generated using manual force with no stored energy used to rotate the helix. In yet other embodiments, a tension spring may be used, e.g., manual actuation of actuator 50 loads a tension spring that then causes the helix 42 to rotate in a loading direction, such that no stored energy is required to rotate the helix in the dispensing direction.

Figure 8:
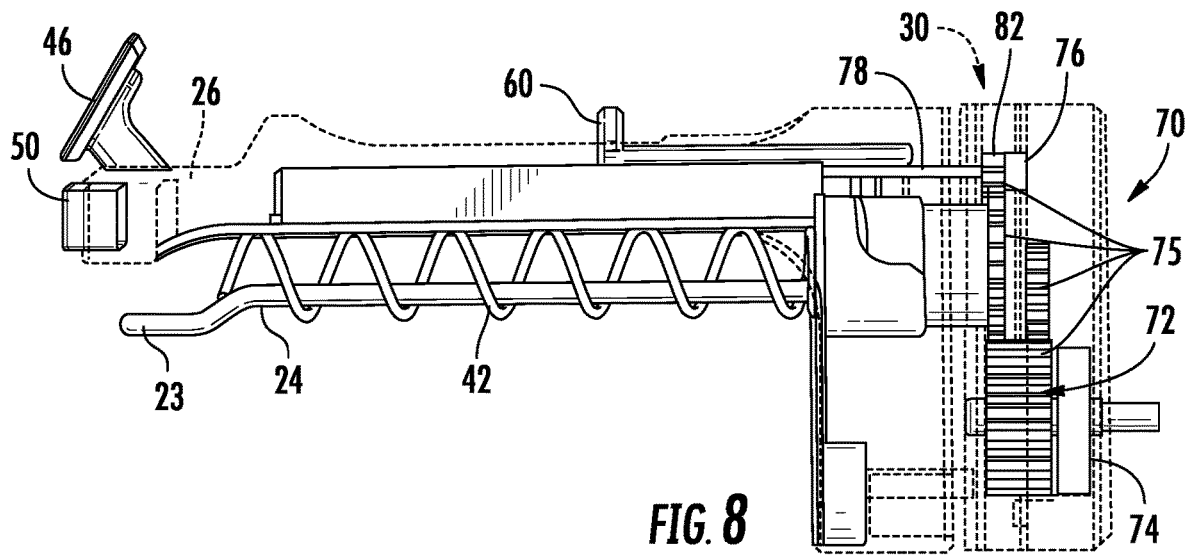
FIG. 8 is side view of a display hook according to one embodiment of the present invention.
Figure 9:
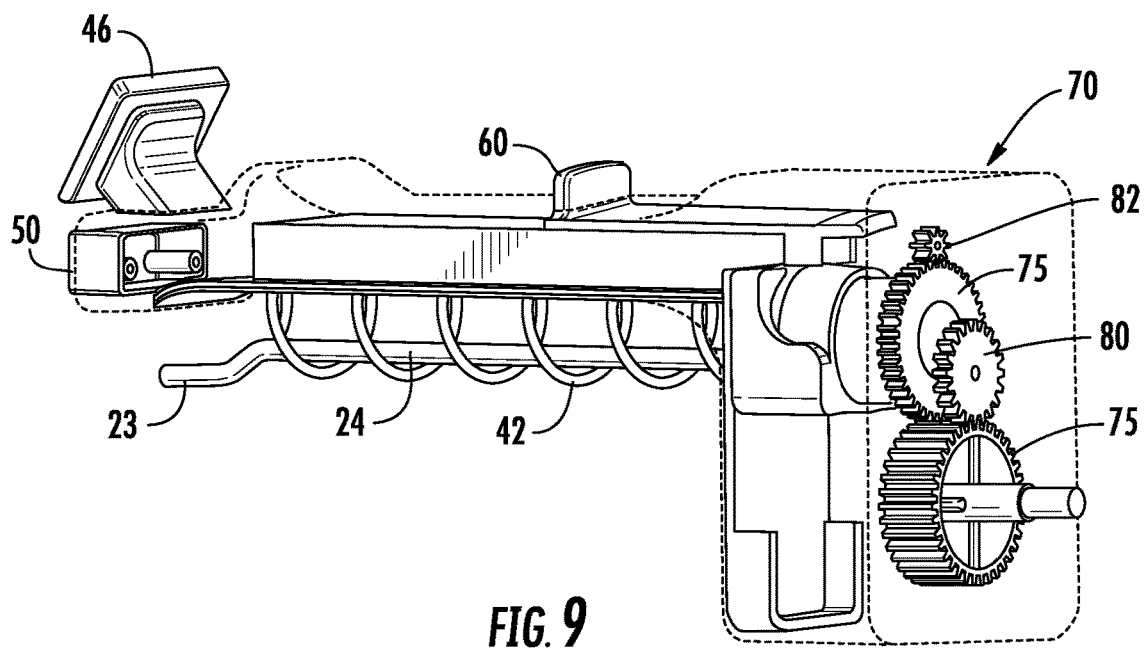
FIG. 9 is a rear perspective view of the display hook shown in FIG. 8.
Figure 10:
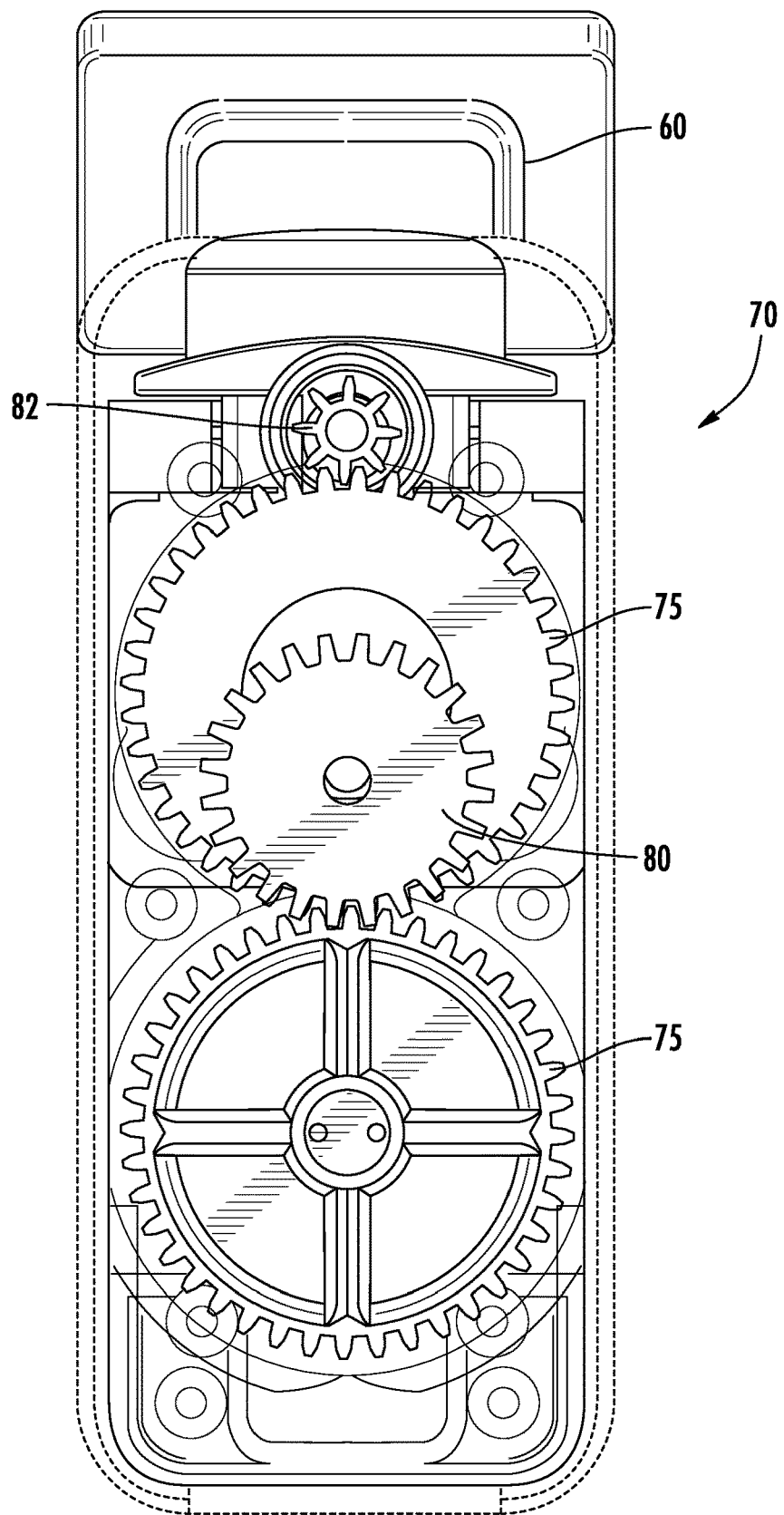
FIG. 10 is rear view of an anchor escapement according to one embodiment of the present invention.
Figure 11:
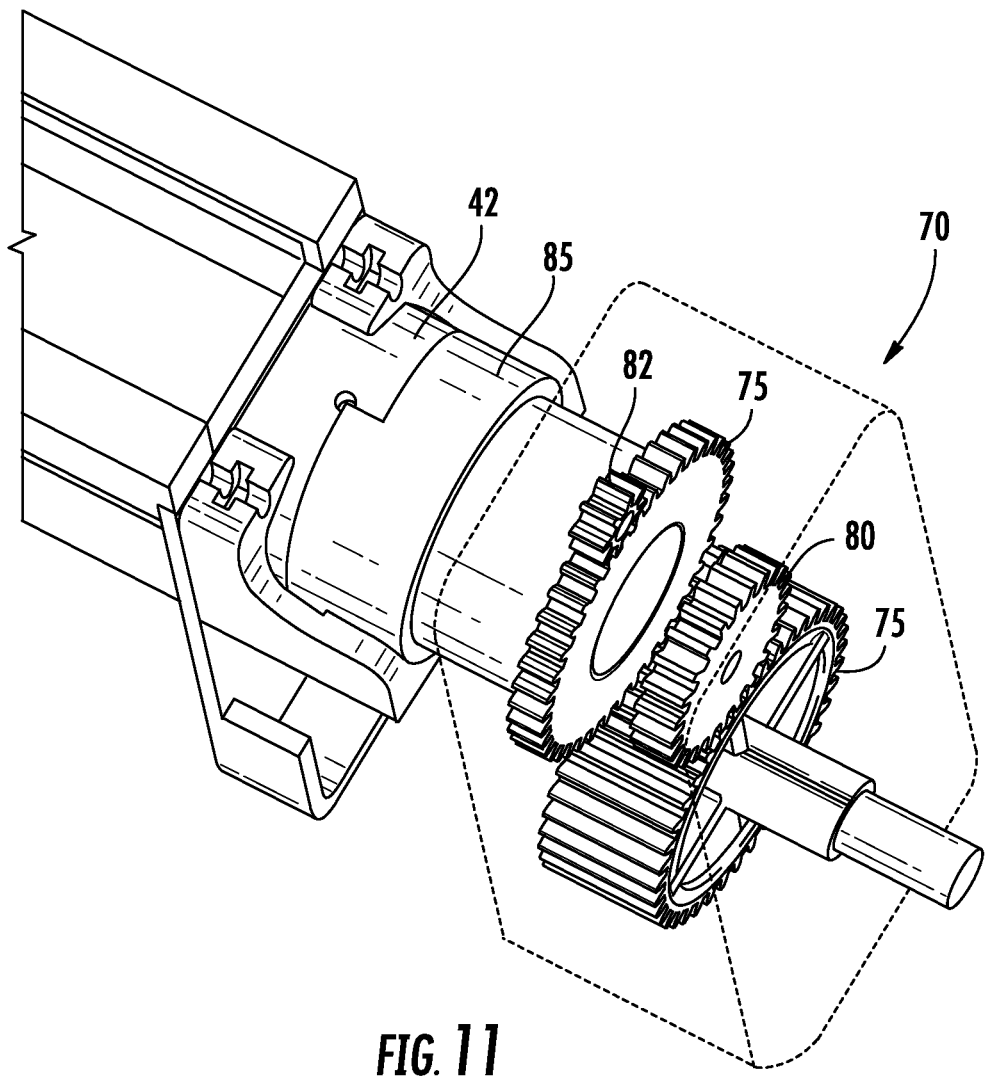
FIG. 11 is a top view of the anchor escapement shown in FIG. 10.

The actuator 50 may be operably coupled to the anchor escapement 70 for dispensing items of merchandise 12. For example, FIG. 8 shows that the lower rod 24 and helix 42 terminate in the base 30 and are operably engaged to the anchor escapement 70, while the actuator 50 is operably engaged with the upper rod 26 and the anchor escapement. In one embodiment, actuation of the actuator 50 results in linear movement of a locking shuttle 85 that is engaged with the helix 42, which in turn disengages the locking shuttle from the helix and allows the helix to rotate in a dispensing direction (opposite to the loading direction) due to the biasing element 74 being biased from its loaded state. Thus, linear or non-rotary actuation of the actuator 50 may result in rotation of the helix 42. The axis of rotation of the helix 42 may be parallel to the axis of linear movement of the actuator 50 in some embodiments. The helix 42 may rotate one full revolution for dispensing an item of merchandise 12. When the actuator 50 returns to its initial position, such as via a spring, the locking shuttle 85 again engages the helix 42. Thus, the anchor escapement 70 may be configured to limit rotation of the helix 42 to one full rotation, and only one item of merchandise may be dispensed for each actuation of the actuator 50. Thus, holding down the actuator 50 will not result in a plurality of items of merchandise being dispensed from the lower rod 24.

In some embodiments, the anti-sweep mechanism 40 prevents serial actuation of the actuation without first waiting a predetermined period of time (e.g., about 5 seconds), sometimes referred to as a "time delay". Thus, even if a customer pushes the actuator 50 multiple times within the predetermined period of time, only one item of merchandise will be dispensed. The anti-sweep device 40 may include a manual stop that prevents actuation of the actuator 50 within the predetermined period of time, or the actuator may be temporarily decoupled from the anchor escapement. In other cases discussed in further detail below, a damper mechanism may be employed (e.g., using fluid and/or friction). In some embodiments, time delay may be accomplished using an electronic circuit whereby a microprocessor controls the timing of the anti-sweep mechanism. In another embodiment, magnetic forces may be used to facilitate time delay, such as with eddy currents.

Thus, in some embodiments, the anti-sweep mechanism 40 facilitates different modes of operation, e.g., a first mode whereby items of merchandise may be dispensed (e.g., using the actuator 50) and a second mode whereby the anti-sweep mechanism is disabled or otherwise prevented from dispensing additional items of merchandise (e.g., via time delay). In other embodiments, additional modes may be employed as discussed herein, such as a third mode whereby items of merchandise may be loaded using a loading mechanism 60.

Although manual actuation of the actuator 50 has been discussed, it is understood that the actuator may be automatically actuated in some embodiments. For example, removal of the item of merchandise 12 may automatically actuate the actuator 50 or helix 42, which results in rotation of the helix 42 for advancing the remaining items of merchandise on the lower rod 24. The automatic actuation may be accomplished using a switch or other mechanism that is activated in response to removing an item of merchandise from the lower rod 24, or via an electronic actuator 50 that is configured to communicate each actuation to operate the anti-sweep mechanism 40.

Figure 6:
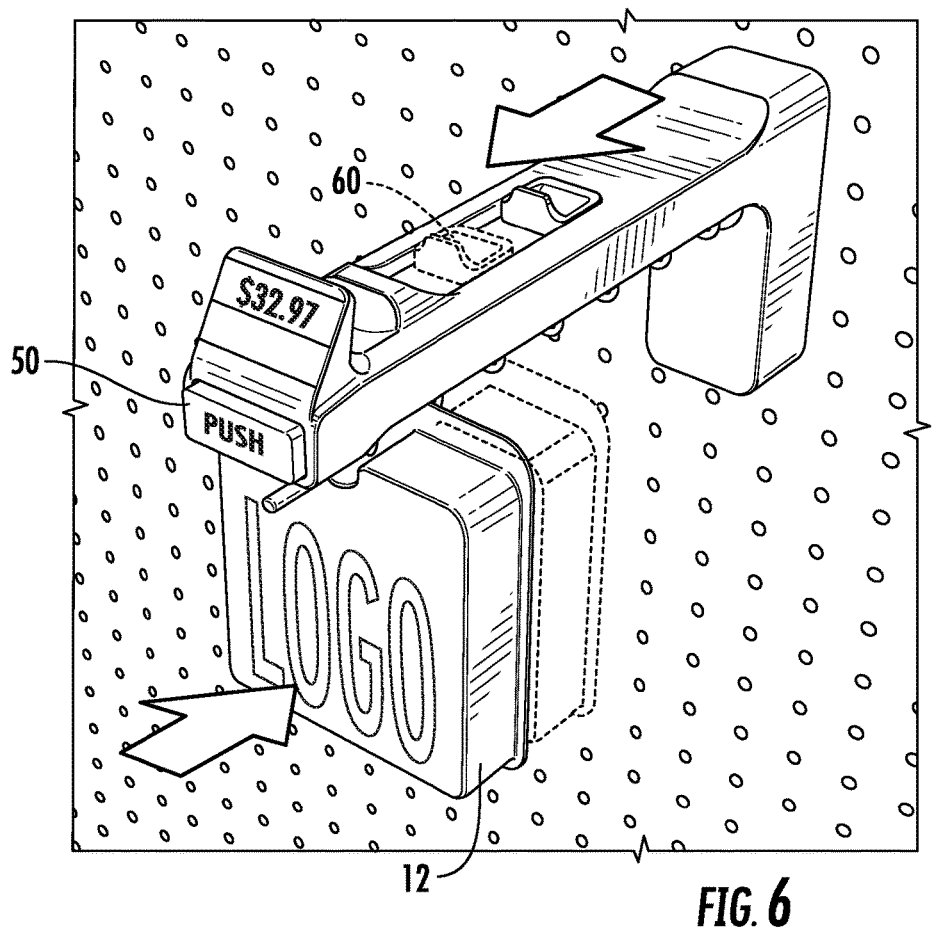
FIG. 6 is a perspective view of the display hook shown in FIG. 1 having a loading mechanism according to one embodiment of the present invention.

In operation, the display hook 20 including the anti-sweep mechanism 40 is first mounted onto the display fixture 10. In one embodiment, the display hook 20 is mounted to the display fixture 10, and the base 30 may be locked to secure the display hook to the display fixture 10. A first item of merchandise 12 is then positioned over the free end 23 of the lower rod 24 and adjacent to a free end 32 of the helix 42. The loading mechanism 60 is next actuated to load the first item of merchandise 12 onto the lower rod 24. For instance, FIG. 6 shows that the loading mechanism 60 may be moved in a direction away from the display fixture 10 which causes the helix 42 to rotate in a direction that advances a first item of merchandise 12 onto the lower rod 24 and towards the display fixture. A second, or subsequent, item of merchandise 12 may be positioned onto the free end 23 of the lower rod and adjacent to a free end 32 of the helix 42 in place of the previous item of merchandise. The process of positioning an item of merchandise 12 onto the lower rod 24 may be repeated until all of the items are suspended from the lower rod 24 between the base 30 and the free end 32 of the helix 42. In this manner, the anti-sweep mechanism 40 is operable to load or stock a desired number of items of merchandise 12 onto the lower rod 24 of the display hook 20.

The items of merchandise 12 can be dispensed individually from the lower rod 24 of the display hook 20 by operating the anti-sweep mechanism 40. In one embodiment shown in FIG. 4, the actuator 50 is actuated (e.g., by pressing a button) which causes the helix 42 to rotate for advancing the items of merchandise 12 along the lower rod 24. The item of merchandise 12 nearest the free end 32 of the helix is advanced by the helix 42 onto the free end 23 of the lower rod 24. In some cases, the item of merchandise 12 that is advanced by the helix 42 may slide along the lower rod 24 onto the free end 23 under the influence of gravity. The item of merchandise 12 may be supported on the free end 23 until a consumer removes the item of merchandise from the free end.

Figure 12:
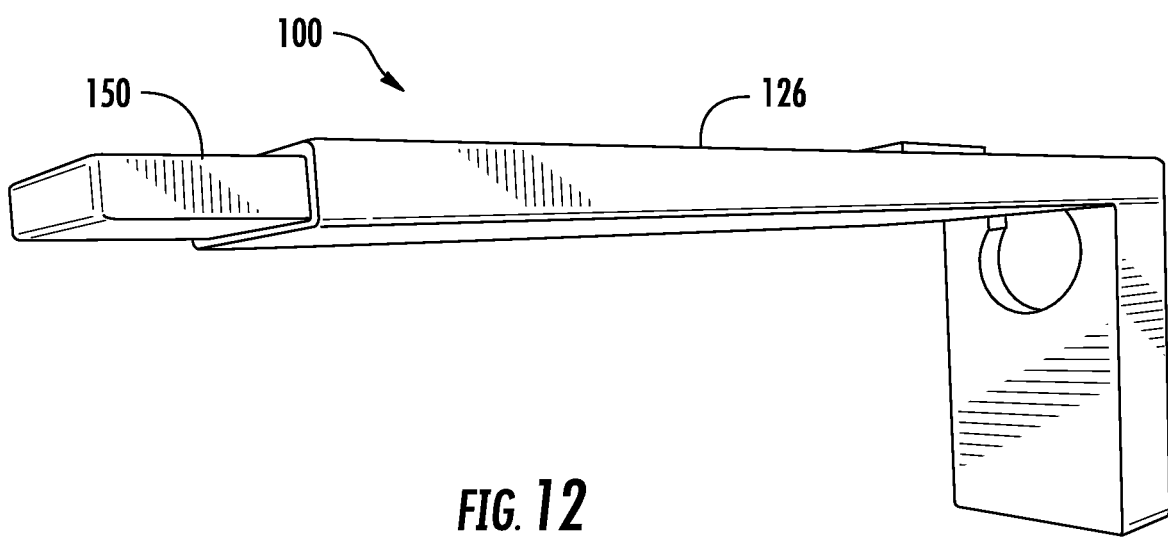
FIG. 12 is a perspective view of a package insert according to one embodiment of the present invention.
Figure 13:
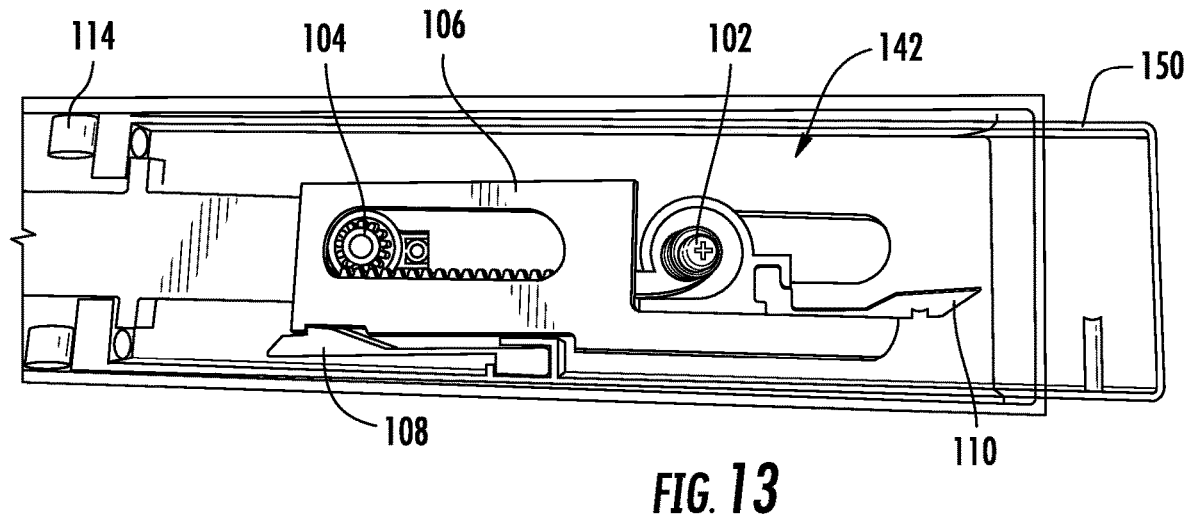
FIG. 13 is a top view of the display hook shown in FIG. 12 with an actuator in a relaxed state.
Figure 14:
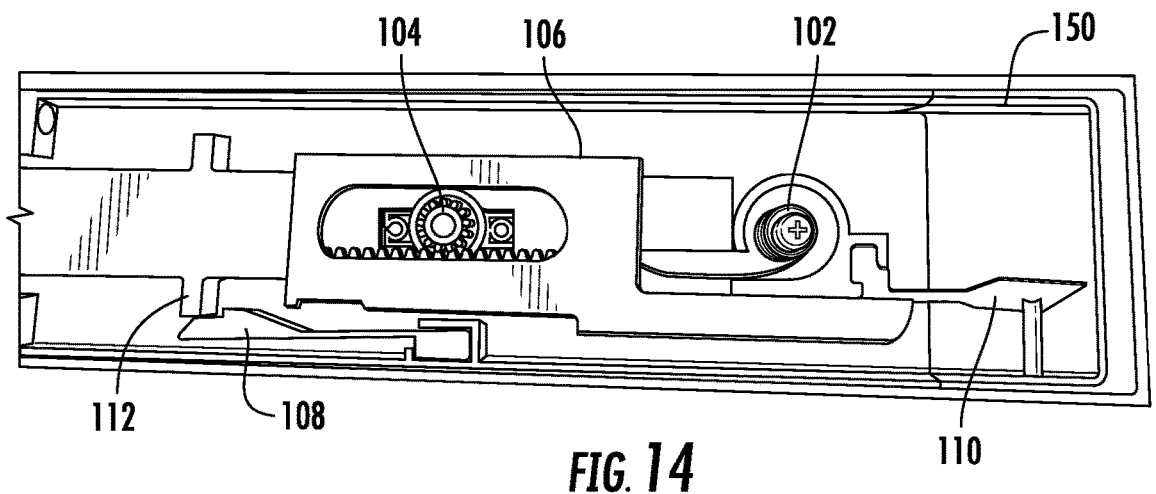
FIG. 14 is an enlarged top view of the display hook shown in FIG. 12 with the actuator in an actuated state.

FIGS. 12-14 illustrate another embodiment of the present invention. In this embodiment, the merchandise display hook 100 includes a time delay mechanism 142 (the helix 42 and lower rod 24 are not shown for purposes of illustration). The merchandise display hook 100 includes an actuator 150, similar to the actuator 50 described above, wherein the actuator may be configured to be depressed for dispensing one or more items of merchandise. The time delay mechanism 142 may be configured to disable the actuator 150 for a predetermined period of time whereby actuation of the actuator does not dispense additional items of merchandise. In this embodiment, the time delay mechanism 142 is housed within the upper rod 126, although the time delay mechanism could be located at any other desired location, such as in the base 30.

FIG. 13 shows the actuator 150 in a relaxed or undepressed state, while FIG. 14 shows the actuator 150 in an actuated or depressed state. As shown, the time delay mechanism 142 includes a biasing mechanism 102 (e.g., a constant force spring) and a damper mechanism 104, each of which is operably coupled to a movable shuttle 106 or sled. The damper mechanism 104 is configured to cause a predetermined delay whereby the actuator 150 is disabled or otherwise unable to be actuated for dispensing an item of merchandise. In this embodiment, the damper mechanism 104 includes a rack and pinion gear that allows the movable shuttle 106 to move at a predetermined speed. For instance, the pinion may be configured to rotate at a desired rate of rotation which thereby determines the rate at which the movable shuttle 106 is moved.

The time delay mechanism 142 also includes a first engagement mechanism 108 and a second engagement mechanism 110. The first engagement mechanism 108 is configured to engage the movable shuttle 106 in the relaxed state. When the actuator 150 is initially actuated, the first engagement mechanism 108 moves along with the movable shuttle 106. As shown in FIG. 14, when the actuator 150 reaches its maximum throw or displacement when actuated, the first engagement mechanism 108 engages a stop member 112 and disengages the movable shuttle 106 (e.g., via camming action). In addition, the second engagement mechanism 110 engages the actuator 150 thereby preventing the actuator from returning to the relaxed state. The biasing mechanism 102 then biases the movable shuttle 106 towards the second engagement mechanism 110. The movable shuttle 106 is configured to disengage the second engagement mechanism 110 from the actuator 150 (e.g., via camming action), which allows the actuator to return to the relaxed state. A biasing mechanism 114 (e.g., a spring) may be employed to bias the actuator 150 towards the relaxed state. Thus, when the second engagement mechanism 110 disengages the actuator 150, the biasing mechanism 114 biases the actuator to the relaxed state, while the damper mechanism 104 controls the rate at which the movable shuttle 106 returns to its initial state.

Figure 15:
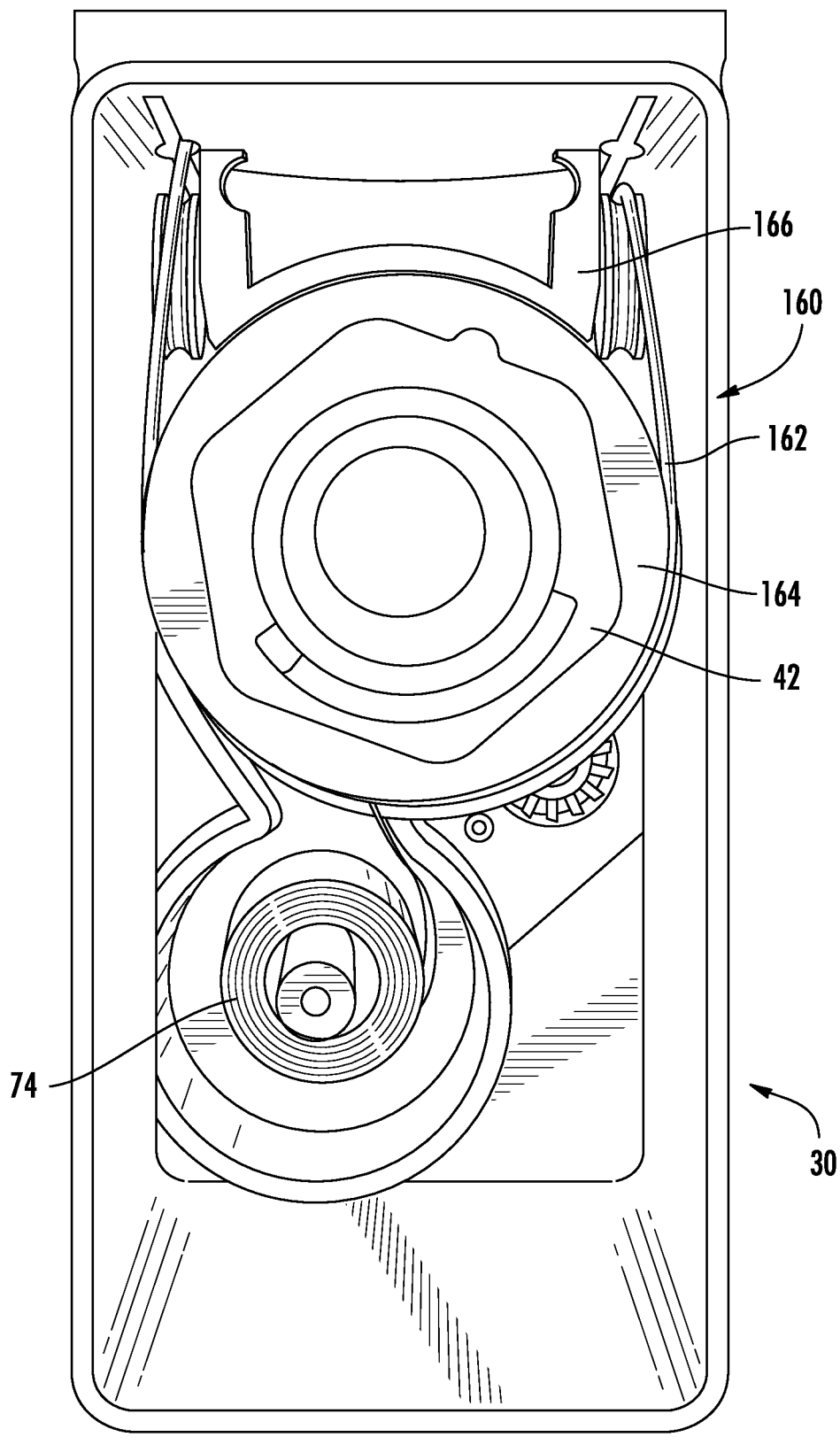
FIG. 15 is a rear view of a cable clutch mechanism according to one embodiment of the present invention.

As discussed above, embodiments of the present invention may facilitate the conversion of linear motion to rotary motion or vice versa. For instance, linear actuation of the actuator 50, 150 and/or loading mechanism 60 may result in rotation of the helix 42. Various mechanisms may be utilized to achieve this such as, for example, a lead screw, a rack and pinion gear, and a cable clutch or drive. FIG. 15 shows an example of a cable clutch mechanism 160 which may be at least partially housed within the base 30. Thus, as before, the drive mechanism for the helix 42 may be located in the base 30 rather than at a free end 32 of the helix 42. The cable clutch mechanism 160 may be operably engaged with the helix 42 such that tensioning a cable 162 may cause rotation of the helix. The cable 162 may be operably engaged with the actuator 50, 150 and/or the loading mechanism 60 and may be any desired configuration. In one instance, tensioning the cable 162 in a first direction may cause the cable to engage and rotate the helix 42 in a first direction (e.g., a loading direction). FIG. 15 demonstrates that the base 30 may include a rotatable member 164 that is engaged with an end of the helix 42. Thus, tensioning of the cable 162 may cause the rotatable member 164 and helix 42 to rotate in the first direction. The cable 162 may be smooth and engage a recess defined about the circumference of the rotatable member 164 or the cable may have features for engaging corresponding features on the outer circumference of the rotatable member to facilitate rotation of the rotatable member. The rotatable member 164 may be operably engaged with a biasing element 74. As discussed above, rotation of the helix 42 in one direction may serve to load the biasing element 74 for subsequently dispensing items of merchandise. In the case of the cable clutch mechanism 160, tensioning of the cable 162 may rotate the rotatable member 164 and thereby load the biasing element 74. As discussed above, a clutch 166 may be employed to allow the rotatable member 164 to rotate in only one direction until the clutch is disengaged. For instance, actuation of the actuator 50, 150 may facilitate disengagement of the clutch 166 from the rotatable member 164 and allow the rotatable member to rotate in an opposite direction under the bias of the biasing element 74. The cable 162 may be any suitable component configured to facilitate engagement with the cable clutch mechanism, such as a cable, tether, chain, belt, or the like.

Figure 17:
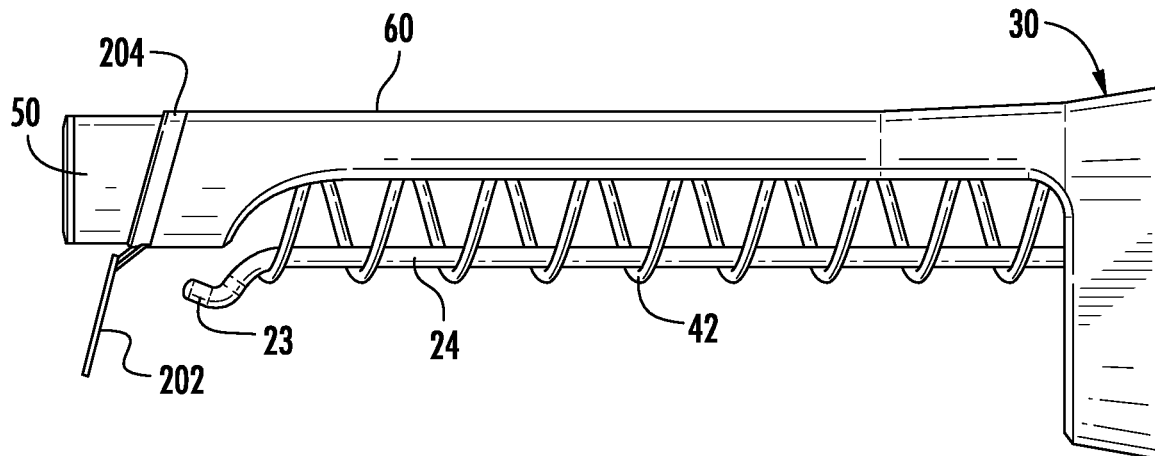
FIG. 17 is a side view of the display hook shown in FIG. 16.
Figure 18:
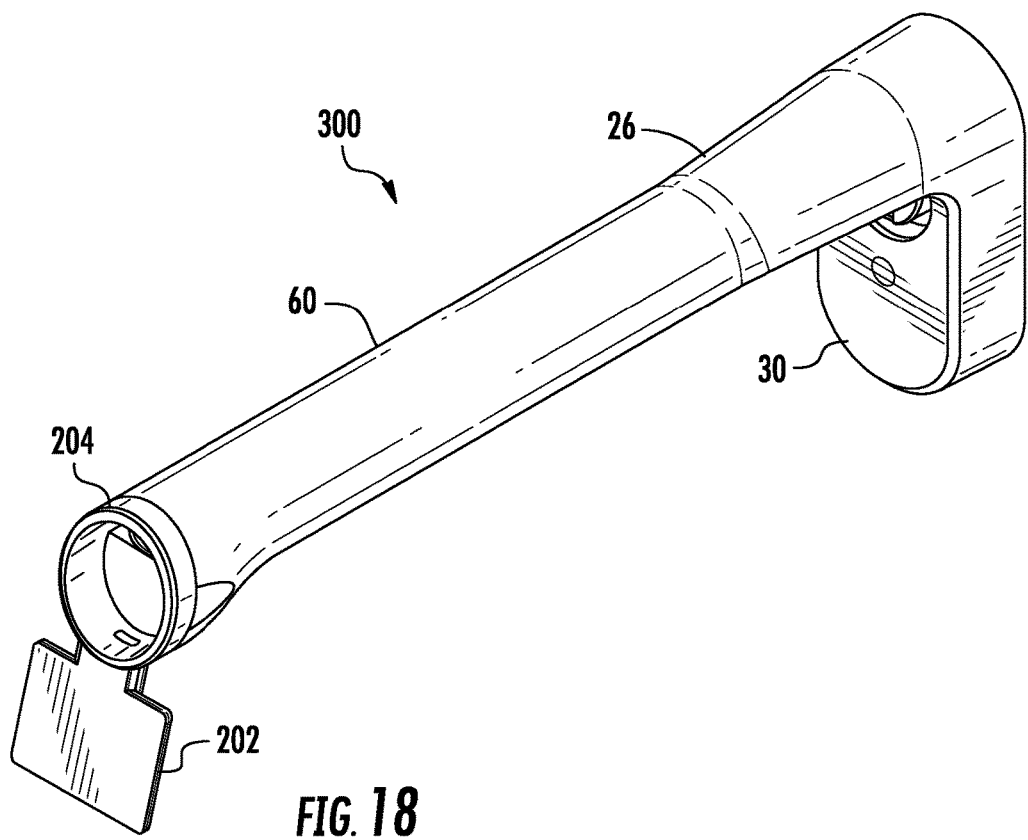
FIG. 18 is a perspective view of a display hook according to one embodiment of the present invention.
Figure 19:
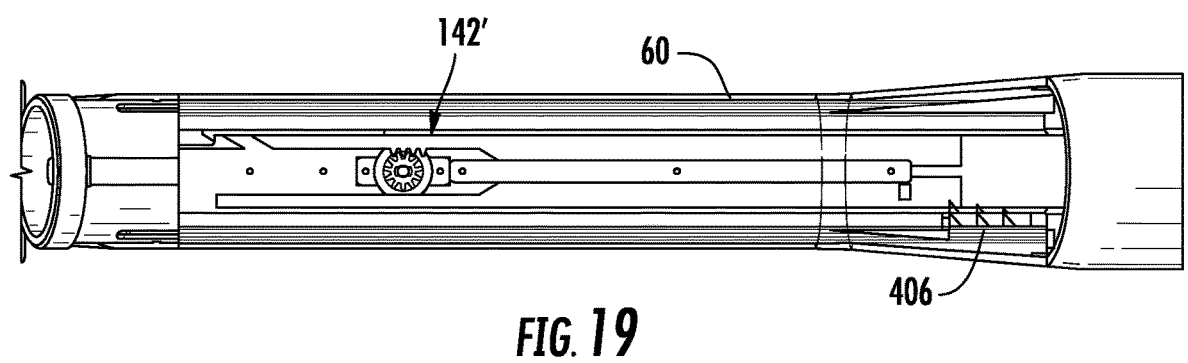
FIG. 19 is a top view of the display hook shown in FIG. 18.
Figure 20:
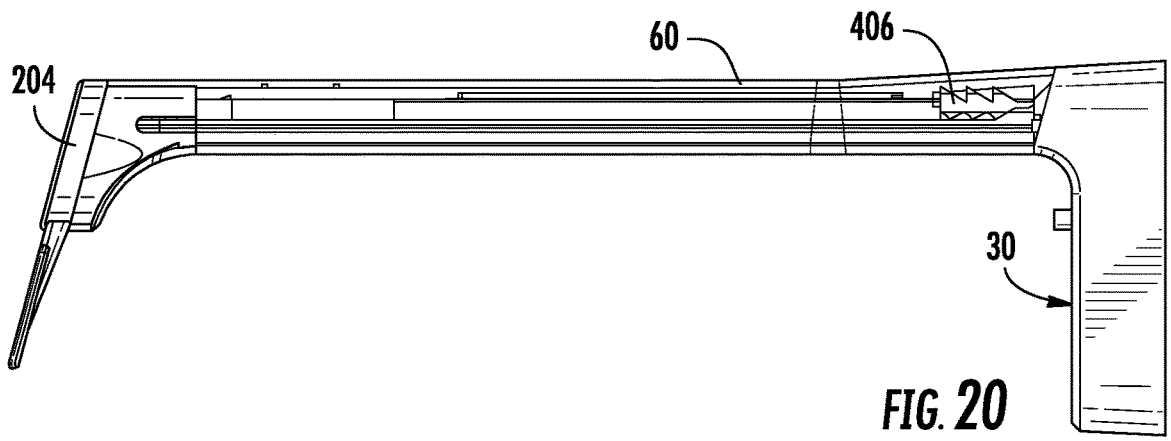
FIG. 20 is a side view of the display hook shown in FIG. 18.

FIGS. 16-17 illustrate another embodiment of a merchandise display hook 200. The merchandise display hook 200 has similar features as the embodiments described above but further illustrates that the actuator 50 and loading mechanism 60 may take various different forms. For example, the loading mechanism 60 may be formed as part of the upper rod 26. Moreover, the merchandise display hook 200 includes a hang tag 202 for displaying a price or other information regarding the items of merchandise on display. In one embodiment, the hang tag 202 may be configured to rotate relative to the upper rod 26. For example, a groove 204 or other guiding element or feature may be defined at least partially about the outer circumference of the rod 26, and the hang tag 202 may be configured to rotate about the groove. The hang tag 202 may be configured to be fixed in place at any desired rotational position about the upper rod 26, which may be a product of the preferences of a retailer or the particular item of merchandise on display.

Figure 21:
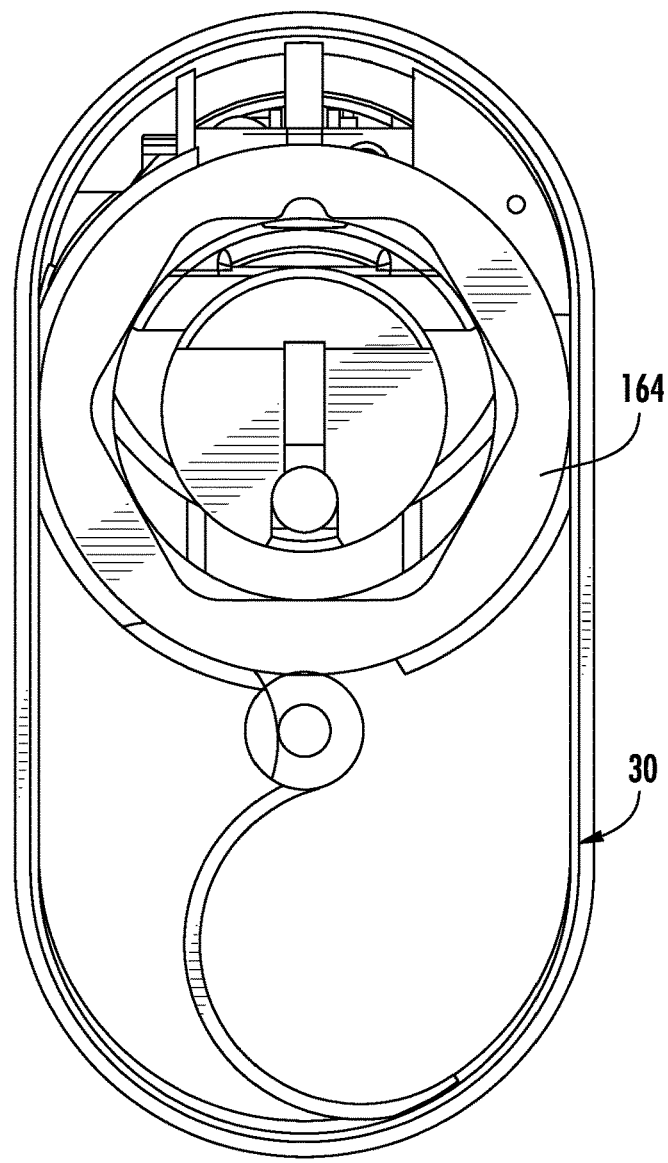
FIG. 21 is a rear view of a base of the display hook shown in FIG. 18.
Figure 22:
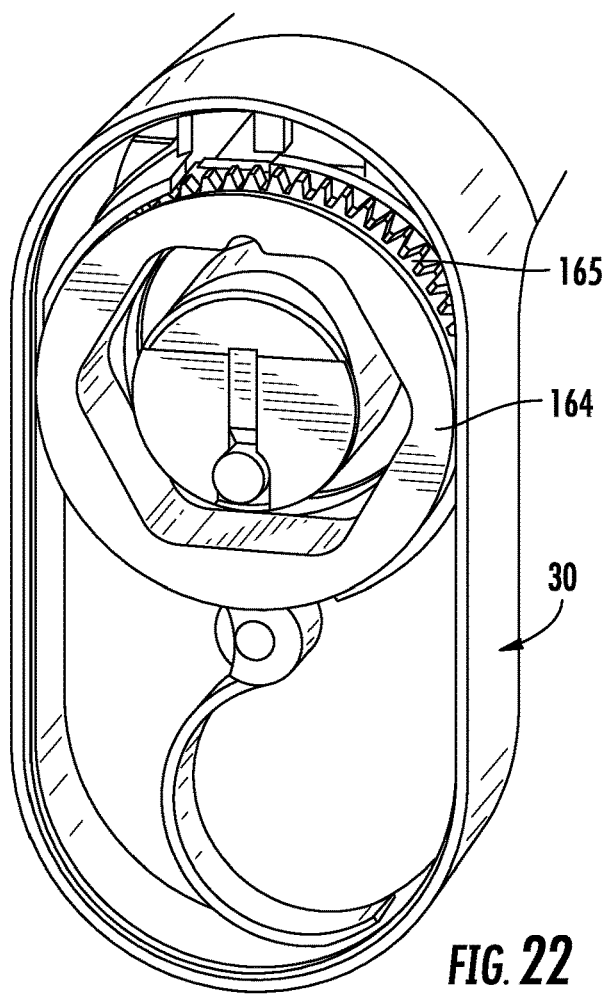
FIG. 22 is a rear perspective view of the base shown in FIG. 21.
Figure 23:
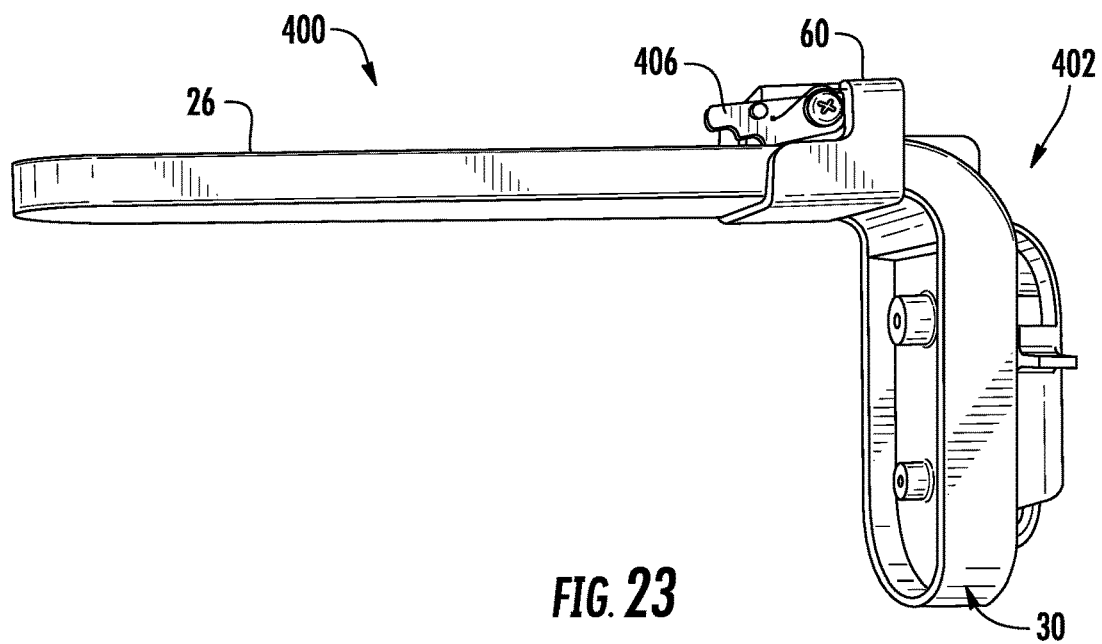
FIG. 23 is a perspective view of a display hook according to one embodiment of the present invention.
Figure 24:
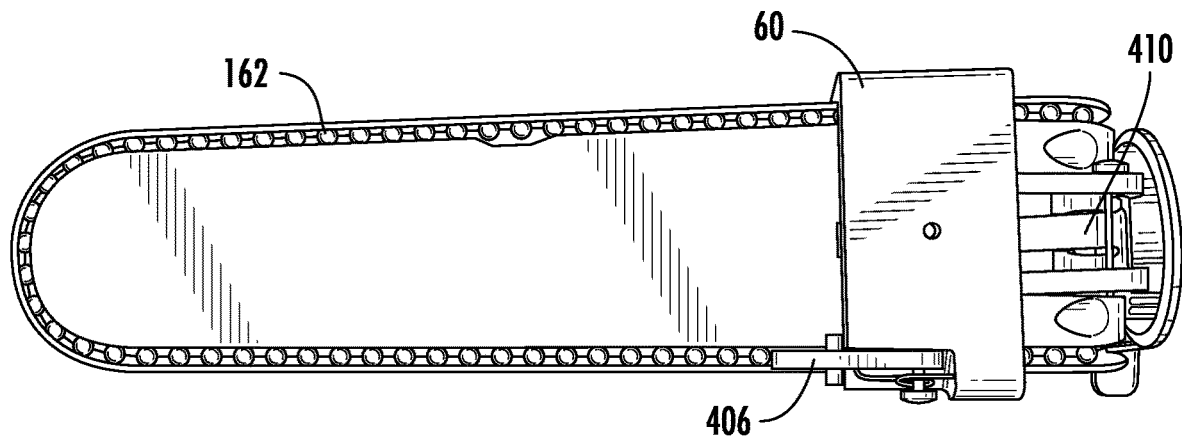
FIG. 24 is a top view of the display hook shown in FIG. 23.
Figure 25:
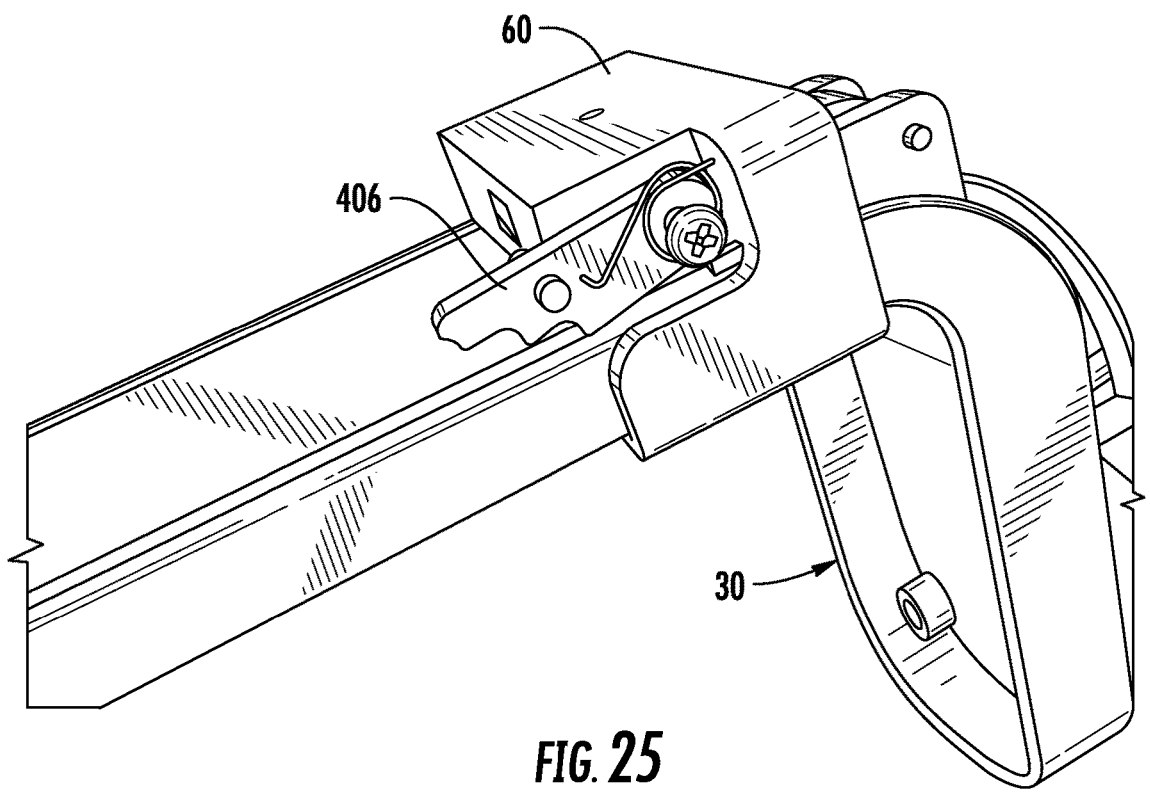
FIG. 25 is an enlarged perspective view of a loading mechanism of the display hook shown in FIG. 23.
Figure 26:
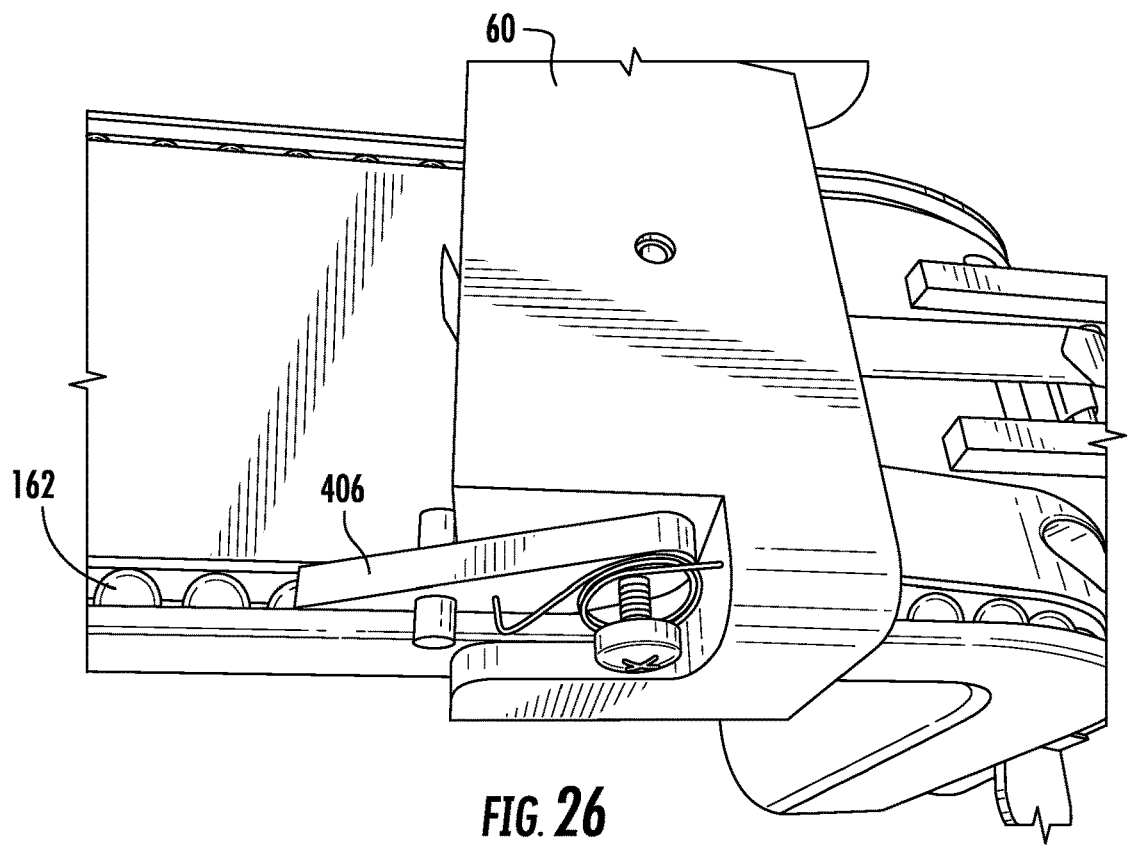
FIG. 26 is a top perspective view of the loading mechanism shown in FIG. 25.

FIGS. 18-22 show another embodiment of a merchandise display hook 300. Several components have been omitted for purposes of illustration, including actuator 50, lower rod 24, and helix 42. Similar to the embodiments discussed above, the display hook 300 may include a time delay mechanism 142'. FIGS. 21-22 show a rear view of the base 30 that is configured to receive and engage a cable 162 as discussed above. In this embodiment, a clutch is not employed in order to facilitate loading and dispensing of the helix 42. In FIG. 22, it can be seen that the rotatable member 164 includes a plurality of engagement members 165 arranged at least partially about the outer circumference of the rotatable member for engaging a cable 162. In some cases, the rotatable member 164 may be a gear.

Figure 27:
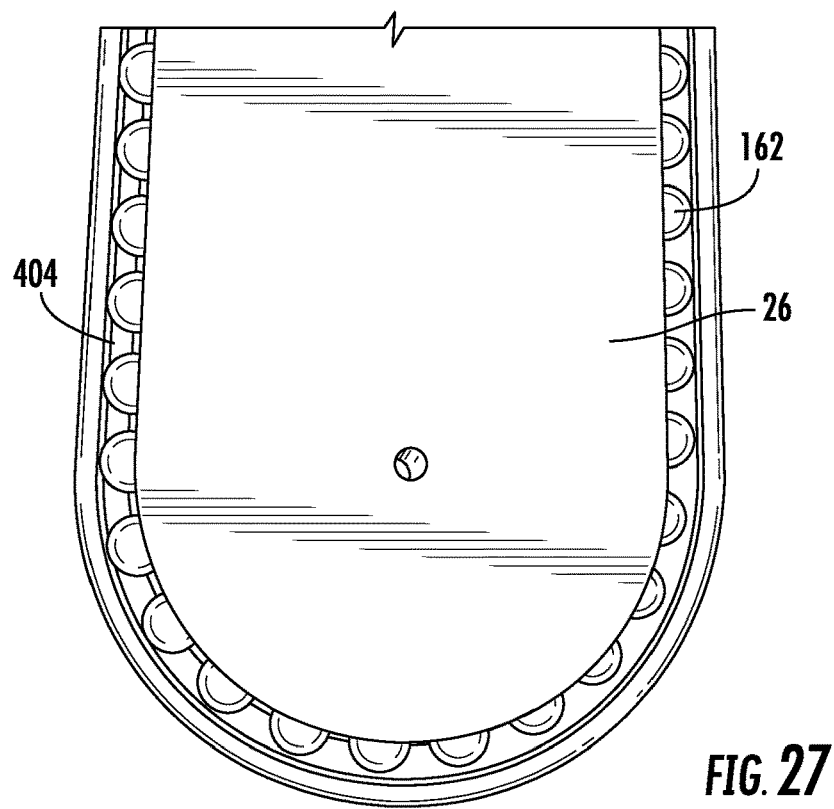
FIG. 27 is a top view of the upper rod of the display hook shown in FIG. 23.
Figure 28:
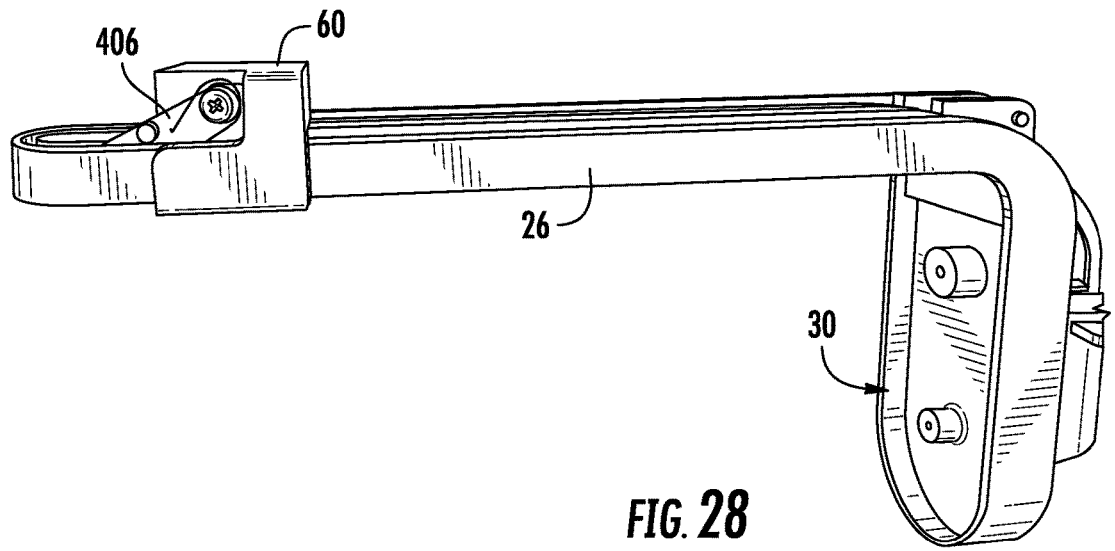
FIG. 28 is a side perspective view of the loading mechanism shown in FIG. 25 in an actuated state.
Figure 29:
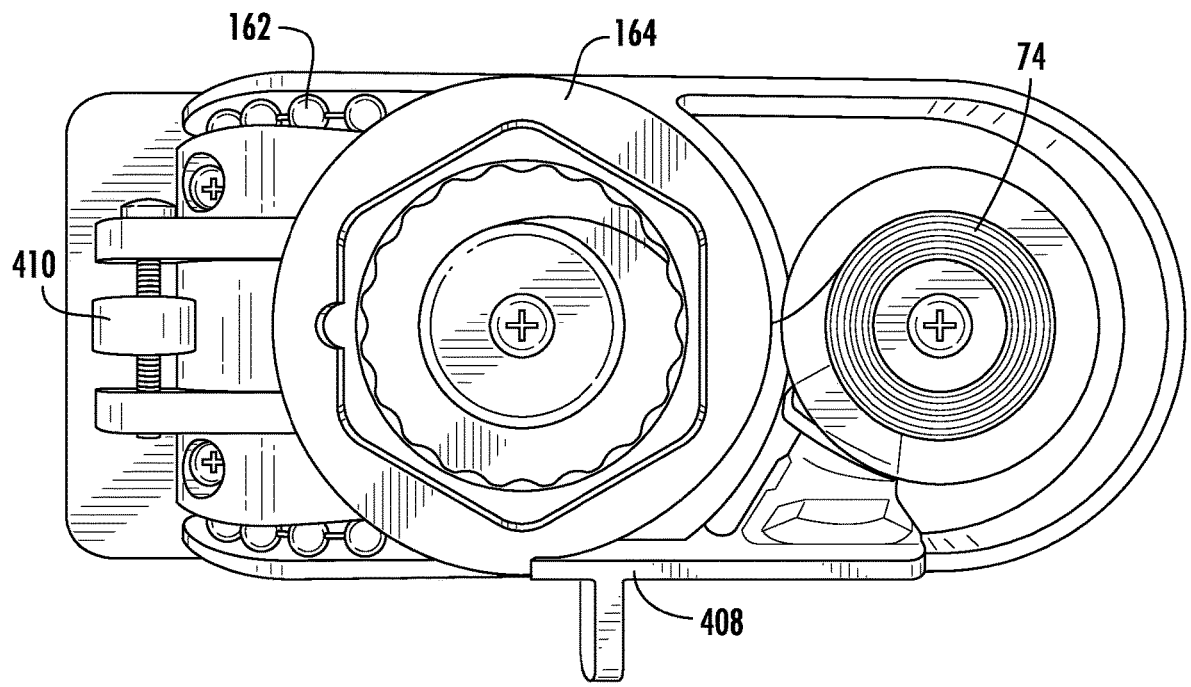
FIG. 29 is a rear view of a cable drive mechanism of the display hook shown in FIG. 23.
Figure 30:
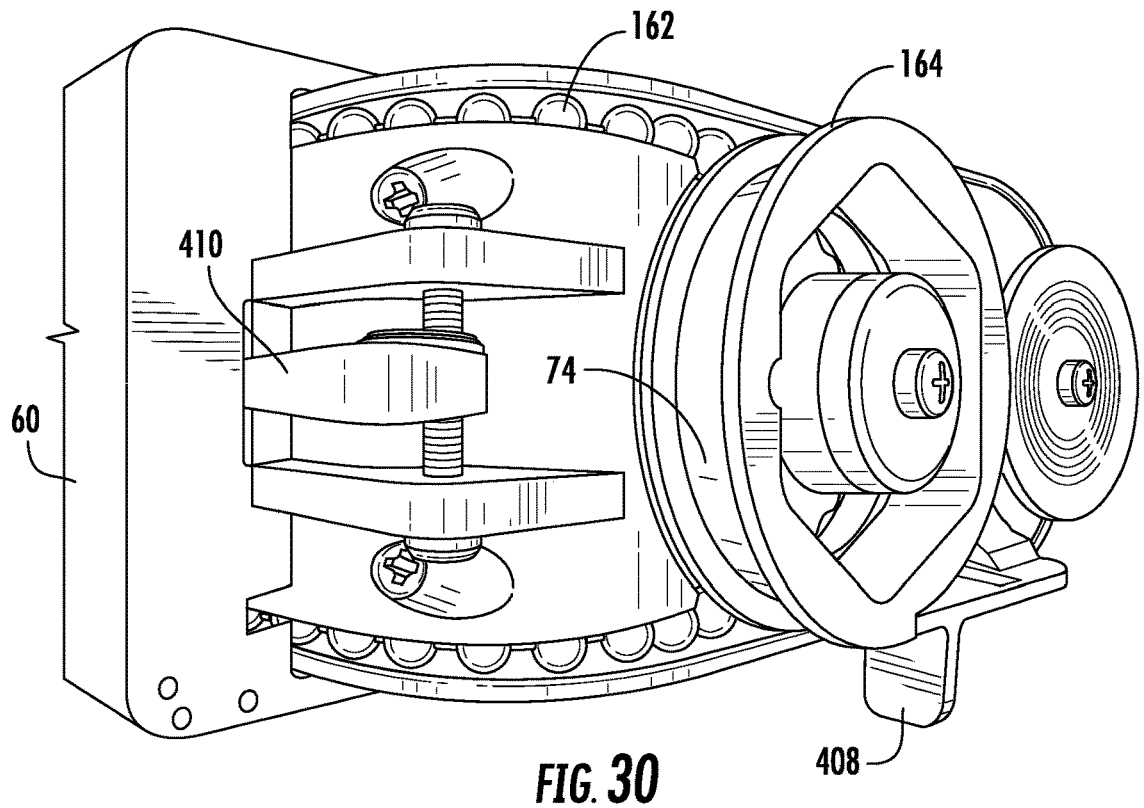
FIG. 30 is a top perspective view of the cable drive mechanism shown in FIG. 29.

FIGS. 23-30 show another embodiment of a merchandise display hook 400. In this embodiment, a loading mechanism 60 is configured to operate in conjunction with a cable drive mechanism 402. The cable 162 may be in the form of a beaded chain or the like as shown in FIG. 27. The upper rod 26 may define a channel 404 or recess defined at least partially about its perimeter for receiving the cable 162 therein. The cable 162 may be configured to slide within the channel 404. The loading mechanism 60 may include a drive member 406 that is configured to engage the cable 162 when the loading mechanism is actuated for loading an item of merchandise. The drive member 406 is configured to pivot between engaged and disengaged positions relative to the cable 162. In the illustrated embodiment, moving the loading mechanism 60 away from the base 30 and towards the end of the upper rod 26 causes the drive member to pivot or move from a disengaged position (see, e.g., FIG. 25) to an engaged position with the cable 162 (see, e.g., FIGS. 26 and 28). When engaged with the cable 162, moving the loading mechanism 60 results in tensioning or movement of the cable 162 in a direction that rotates the rotatable member 164. In some cases, the loading mechanism 60 may be configured to move substantially the length of the upper rod 26, which may allow for at least one full rotation of the rotatable member 164. The loading mechanism 60 may be biased towards its initial position by a biasing member 410, such as a power or clock spring.

As discussed above, the rotatable member 164 may include one or more engagement members 165 configured to engage the cable 162. Thus, movement of the cable 162 in a loading direction causes rotation of the rotatable member 164, which in turn loads the biasing member 74 (e.g., a power spring). A stop member 408 may be employed to allow rotation of the rotatable member 164 in only one direction when the loading mechanism 60 is actuated for loading items of merchandise onto the helix 42. The stop member 408 may be configured to move into and out of engagement with the rotatable member 164. For instance, the stop member 408 may be configured to move out of engagement with the rotatable member 164 when the rotatable member rotates and return to engagement with the rotatable member when the rotatable member completes a full revolution or when the loading mechanism is otherwise no longer actuated. The stop member 408 may be biased (e.g., via a spring) into engagement with the rotatable member 164 such that the stop member automatically engages the rotatable member following rotation of the rotatable member in the dispensing direction. Rotation of the rotatable member 164 in a loading direction causes the helix 42 to turn for loading items of merchandise on the helix. The actuator 50 may be configured to disengage the stop member 408 to allow the rotatable member 164 to rotate in an opposite direction via the biasing member 74, which in turn rotates the helix 42 in a dispensing direction. Disengagement of the stop member 408 allows the cable 162 to move in an opposite direction within the channel 404. In some cases, a damping mechanism 504 may be utilized similar to that described above so that the rotatable member 164 rotates at a desired rate of rotation when dispensing items of merchandise which thereby determines the rate at which the helix 42 rotates (see, e.g., FIG. 33). It is understood that a variety of mechanisms may be employed to facilitate engagement and disengagement of the rotatable member 164 when the actuator 50 is actuated.

Figure 31:
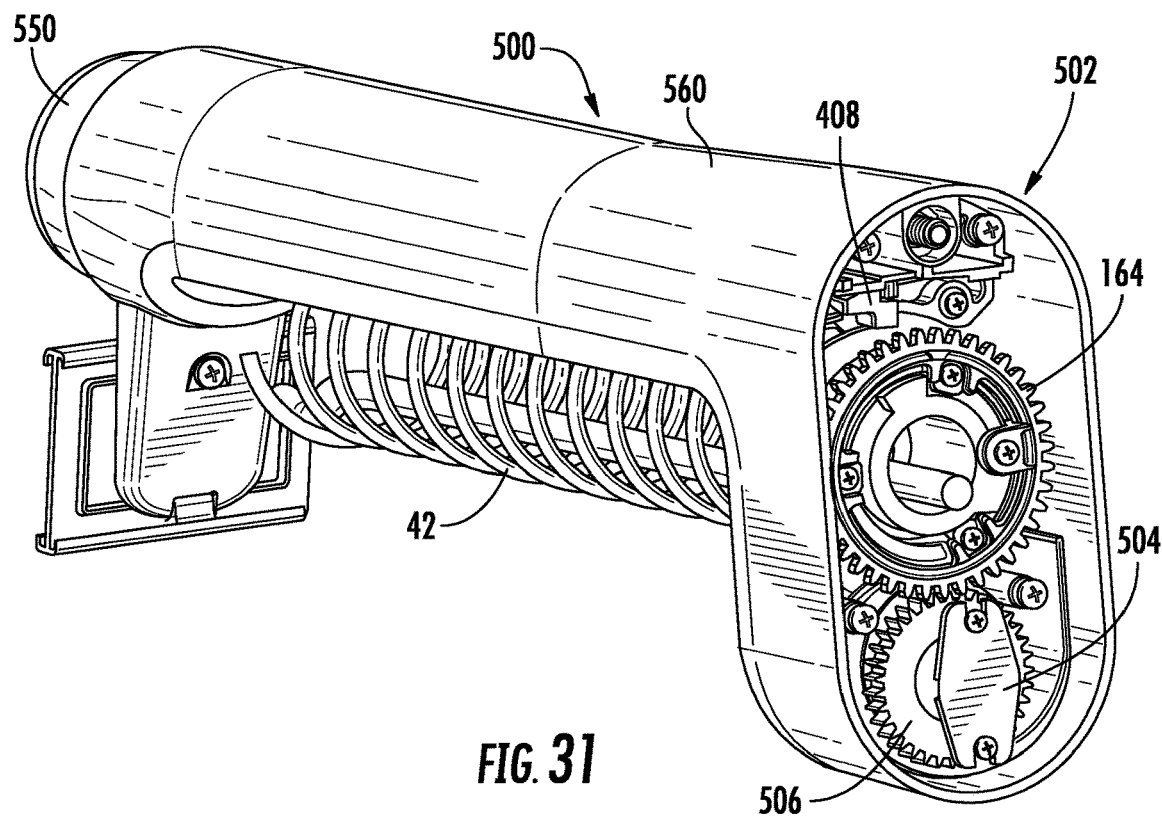
FIG. 31 is a perspective view of a display hook according to one embodiment of the present invention.
Figure 32:
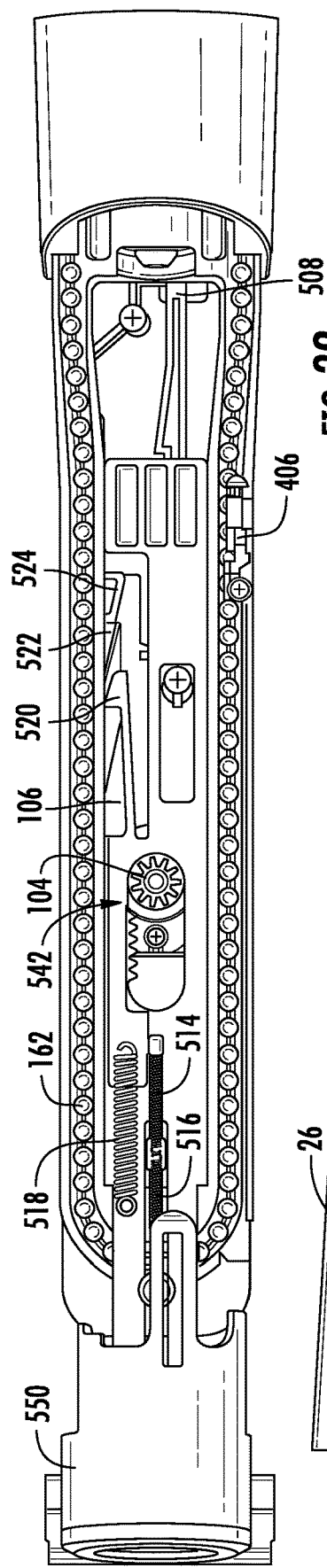
FIG. 32 is a top view of the display hook shown in FIG. 31.
Figure 33:
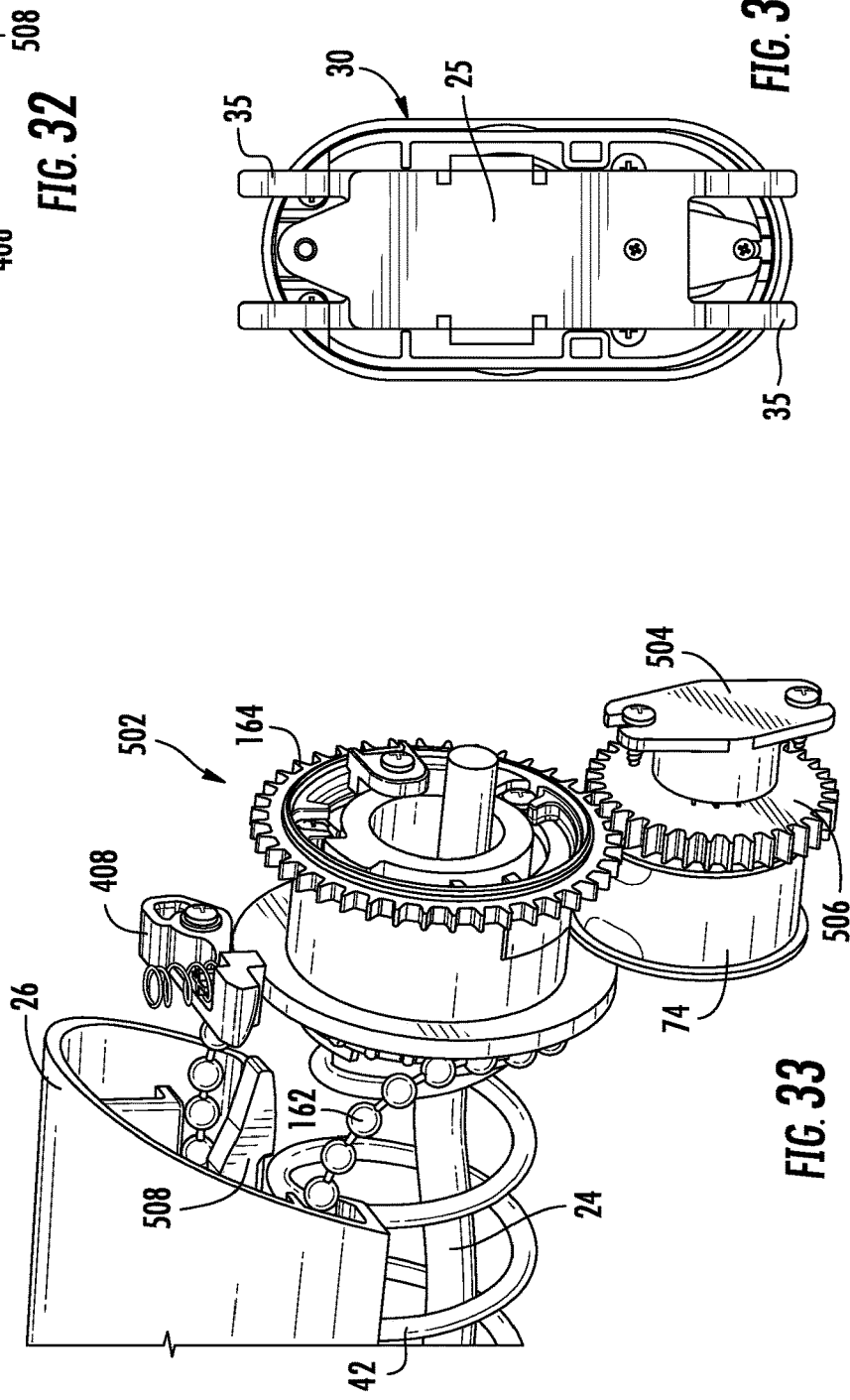
FIG. 33 is a rear perspective view of a cable drive mechanism of the display hook shown in FIG. 31.

FIGS. 31-33 illustrate another embodiment of a display hook 500 that is similar to the embodiments described above. In this embodiment, the display hook 500 includes a time delay mechanism 542 and a cable drive mechanism 502. The cable drive mechanism 502 includes a cable 162 operably engaged with a rotatable member 164, while the rotatable member is operably engaged with a biasing element 74 (e.g., a constant force spring), a dampener 504, and a gear 506. The actuator 550 or movable shuttle 106 may have, or be operably coupled to, an actuation mechanism 508 configured to engage a stop member 408. The stop member 408 may be configured to prevent rotation of the rotatable member 164 in a dispensing direction, while the actuation mechanism 508 may be configured to disengage the stop member 408 to allow the rotatable member 164 to rotate in a dispensing direction via the biasing member 74, which in turn rotates the helix 42 in a dispensing direction. In this instance, a dampener 504 in conjunction with a gear 506 may control the rate of rotation of the rotatable member 164. In one embodiment, the rotatable member 164 may be a gear that is configured to rotatably engage gear 506. When the rotatable member 164 rotates in either a clockwise or counterclockwise direction, the gear 506 also rotates, and the dampener 504 may be a one-way dampener that allows the rotatable member 164 to freely rotate in a loading direction, but limits or slows the rate of rotation of the rotatable member 164 in a dispensing direction.

The display hook 500 also includes a time delay mechanism 542. In this embodiment, the time delay mechanism 542 may be located underneath at least a portion of the actuator 550 and be configured to slide relative to one another. Both the actuator 550 and movable shuttle 106 may be at least partially housed within or otherwise operably coupled to the upper rod 26. The time delay mechanism 542 may include a first engagement mechanism 520 and a second engagement mechanism 522. The first engagement mechanism 520 may be coupled to the actuator 550, while the second engagement mechanism 522 may be part of the upper rod 26. The second engagement mechanism 522 may be fixed in some cases. The first engagement mechanism 520 is configured to move in response to actuation of the actuator 550 (e.g., linear actuation) and to engage the second engagement mechanism 522. The first engagement mechanism 520 may be flexible and configured to engage the second engagement mechanism 522 via camming action. In addition, the movable shuttle 106 and actuator 550 may be initially coupled to one another and be configured to move with the actuator 550 in response to actuation of the actuator 550. The actuation mechanism 508 may be coupled to the movable shuttle 106. When actuator 550 is fully actuated, the actuation mechanism 508 may be configured to disengage rotatable member 164 thereby preventing further actuation of the actuator 550 until the actuator and movable shuttle 106 return to their initial, relaxed position. Upon disengagement of the stop member 408 from the rotatable member 164, the actuation mechanism 508 may be configured to bias out of engagement with the actuator 550 thereby allowing the movable shuttle 106 to move independently of the actuator 550. Upon returning towards its initial relaxed state, a third engagement feature 524 of the movable shuttle 106 is configured to engage first engagement member 522 to disengage the first engagement member from the second engagement member (e.g., via camming action). A biasing mechanism 514 (e.g., a spring) may be employed to bias the actuator 550 towards its initial, relaxed state, while one or more additional biasing mechanisms 516 may be configured to bias the movable shuttle 106 to its initial, relaxed state. Thus, when the first engagement mechanism 520 disengages the second engagement mechanism 522, the second engagement mechanism engages the third engagement mechanism 524 thereby stopping the movable shuttle 106 in its initial, relaxed state, while the actuator 550 continues to move towards its initial state due to the biasing mechanism 514 biasing the actuator 550 towards the relaxed state, while a damper mechanism 104 controls the rate at which the actuator 550 returns to its initial state. In some embodiments, the damper mechanism 104 is mounted to the upper rod 26 and therefore fixed relative to the movable shuttle 106 and actuator 550.

FIGS. 31-33 show another embodiment of a loading mechanism 560 that is configured to operate in conjunction with a cable drive mechanism 502. In this example, the loading mechanism 560 may be formed with, housed by, or otherwise integrated with the upper rod 26 and be disposed between the end of the actuator 50 and the base 30. The loading mechanism 560 may include a drive member 406 that is configured to engage the cable 162 when the loading mechanism is actuated for loading an item of merchandise. The drive member 406 is configured to pivot between engaged and disengaged positions relative to the cable 162. In the illustrated embodiment, manually moving the loading mechanism 560 away from the base 30 and in a direction towards the end of the actuator 550 causes the drive member 406 to pivot or move from a disengaged position to an engaged position with the cable 162. When engaged with the cable 162, moving the loading mechanism 560 results in tensioning or movement of the cable 162 in a direction that rotates the rotatable member 164 due to engagement between the cable and rotatable member in the base 30. In some cases, the loading mechanism 560 may be configured to move a distance that allows for at least one full rotation of the rotatable member 164. The loading mechanism 60 may be biased towards its initial position by a biasing member 518, such as with an extension spring. Similar to the embodiments discussed above, linearly actuating the loading mechanism 560 may result in loading the biasing element 74 which may be subsequently used for dispensing an item of merchandise when the actuator 550 is actuated. In some embodiments, each actuation of the loading mechanism 560 may result in one full rotation of the helix 42. Thus, for each actuation of the loading mechanism 560, the biasing element 74 may be loaded for subsequent dispensing. In particular, the loading mechanism 560 may be configured to be pulled forward (away from the pegboard) for loading the biasing element 74, and the stored spring force may be subsequently used to rotate the helix 42 for dispensing an item of merchandise when the actuator 550 is actuated.

The foregoing has described one or more embodiments of a merchandise display hook for displaying items of merchandise on a display fixture including an anti-sweep mechanism according to the invention. Embodiments of a display hook and anti-sweep mechanism have been shown and described herein for purposes of illustrating and enabling the best mode of the invention. Those of ordinary skill in the art, however, will readily understand and appreciate that numerous variations and modifications of the invention may be made without departing from the spirit and scope of the invention. Accordingly, all such variations and modifications are intended to be encompassed by the appended claims.

That which is claimed is:

1. A merchandise display hook comprising:
   a support structure configured to support one or more items of merchandise thereon, wherein the support structure comprises a base configured to be to be attached to a display fixture for supporting the support structure on the display fixture; and
   an anti-sweep mechanism operably engaged with the support structure and comprising an actuator at an end of the support structure opposite the base configured to be actuated for dispensing the one or more items of merchandise from the support structure in a first mode,
   wherein the anti-sweep mechanism further comprises a loading mechanism for loading one or more items of merchandise onto the support structure in a second mode, wherein the loading mechanism is configured to be actuated in the second mode for storing energy to be used to dispense the one or more items of merchandise from the support structure in the first mode,
   wherein the anti-sweep mechanism further comprises a drive mechanism configured to dispense the at least one item of merchandise in response to actuation of the actuator, wherein the base is configured to house the drive mechanism therein.

2. The merchandise display hook of claim 1, wherein the actuator is configured to be manually actuated for dispensing one or more items of merchandise from the support structure.

3. The merchandise display hook of claim 1, wherein the actuator is configured to be actuated for dispensing a single item of merchandise at a time.

4. The merchandise display hook of claim 1, wherein the actuator is configured to be linearly actuated for dispensing one or more items of merchandise from the support structure.

5. The merchandise display hook of claim 1, wherein the loading mechanism is configured to load a spring in response to actuation thereof.

6. The merchandise display hook of claim 1, wherein the loading mechanism is configured to be linearly actuated.

7. The merchandise display hook of claim 6, wherein the anti-sweep mechanism further comprises a time delay mechanism configured to disable the actuator in a third mode such that the one or more items of merchandise are prevented from being dispensed from the support structure in the third mode.

8. The merchandise display hook of claim 7, wherein the time delay mechanism comprises a damper mechanism.

9. The merchandise display hook of claim 7, wherein the time delay mechanism is configured to disable the actuator for a predetermined period time following actuation of the actuator.

10. The merchandise display hook of claim 1, wherein the support structure comprises a helix disposed about at least one rod, the helix extending at least partially along a length of the at least one rod, the helix configured to rotate in a dispensing direction for dispensing the one or more items of merchandise from the at least one rod in the first mode.

11. The merchandise display hook of claim 10, wherein the at least one rod comprises an upper rod and a lower rod, and wherein the helix is disposed only about the lower rod.

12. The merchandise display hook of claim 10, wherein the anti-sweep mechanism is configured to bias the helix for rotating in the dispensing direction.

13. The merchandise display hook of claim 1, wherein the drive mechanism further comprises a cable in operable engagement with the actuator for dispensing the one or more items of merchandise from the support structure.

14. The merchandise display hook of claim 13, wherein the cable is operably engaged with the loading mechanism such that actuation of the loading mechanism tensions the cable for storing energy to be used to dispense the one or more items of merchandise from the support structure in the first mode.

15. A method for dispensing one or more items of merchandise from a merchandise display hook, comprising:
   securing a merchandise display hook to a display fixture, the merchandise display hook comprising a support structure and an anti-sweep mechanism operably engaged with the support structure, wherein the support structure further comprises a base configured to be to be attached to the display fixture for supporting the support structure on the display fixture;
   actuating an actuator of the anti-sweep mechanism at an end of the support structure opposite the base such that the anti-sweep mechanism dispenses at least one item of merchandise from the support structure in a first mode; and
   actuating the anti-sweep mechanism for loading at least one item of merchandise onto the support structure in a second mode, wherein actuating the anti-sweep mechanism in the second mode comprises actuating the anti-sweep mechanism in the second mode for storing energy to be used to dispense the one or more items of merchandise from the support structure in the first mode, wherein the anti-sweep mechanism further comprises a drive mechanism configured to dispense the at least one item of merchandise in response to actuation of the actuator, wherein the base is configured to house the drive mechanism therein.

16. The method of claim 15, wherein actuating the anti-sweep mechanism comprises manually actuating the actuator for dispensing one or more items of merchandise from the support structure.

17. The method of claim 15, wherein the anti-sweep mechanism comprises a time delay mechanism configured to disable the actuator in a third mode such that the one or more items of merchandise are prevented from being dispensed from the support structure in the third mode.

18. The method of claim 15, wherein actuating comprises actuating the actuator for rotating a helix.

19. The method of claim 18, wherein actuating comprises actuating the actuator such that the anti-sweep mechanism biases the helix for rotating in the first mode.

\* \* \* \* \*